(12) United States Patent
Flemings et al.

(10) Patent No.: US 10,167,704 B2
(45) Date of Patent: Jan. 1, 2019

(54) RESERVOIR PRESSURE PREDICTION AND METHODS OF EXECUTION

(71) Applicant: Board of Regents, The University of Texas System, Austin, TX (US)

(72) Inventors: Peter B. Flemings, Austin, TX (US); Baiyuan Gao, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1072 days.

(21) Appl. No.: 14/472,310

(22) Filed: Aug. 28, 2014

(65) Prior Publication Data

US 2015/0066459 A1    Mar. 5, 2015

Related U.S. Application Data

(60) Provisional application No. 61/871,298, filed on Aug. 28, 2013.

(51) Int. Cl.
| | | |
|---|---|---|
| G06G 7/48 | (2006.01) | |
| E21B 43/00 | (2006.01) | |
| G06F 17/50 | (2006.01) | |

(52) U.S. Cl.
CPC .......... *E21B 43/00* (2013.01); *G06F 17/5009* (2013.01); *G06F 2217/16* (2013.01)

(58) Field of Classification Search
CPC .................................................. E21B 43/00
USPC ........................................................ 703/10
See application file for complete search history.

(56) References Cited

U.S. PATENT DOCUMENTS

| 7,490,028 B2 | 2/2009 | Sayers et al. |
| 2013/0074094 A1 | 3/2013 | Lewis |

OTHER PUBLICATIONS

Barker, C. Aquathermal Pressuring—Role of Temperature in Development of Abnormal-Pressure Zones: Geological Notes. AAPG Bulletin 56, 2068-2071 (1972).
Barker, C. Calculated Volume and Pressure Changes During the Thermal Cracking of Oil to Gas in Reservoirs (1), AAPG Bulletin 74, pp. 1254-1261 (1990).
Blanpied, M.L. et al. An earthquake mechanism based on rapid sealing of faults. Nature 358, pp. 574-576 (1992).
Brehoeft, J.D. et al. On the maintenance of anomalous fluid pressures: I. Thick sedimentary sequences. Geological Society of America Bulletin 79, pp. 1097-1106 (1968).
Bruce, C.H. Smectite dehydration—its relation to structural development and hydrocarbon accumulation in northern Gulf of Mexico basin. AAPG Bulletin 68, pp. 673-683 (1984).
Burst, J.F. Diagenesis of Gulf Coast clayey sediments and its possible relation to petroleum migration. AAPG Bulletin 53, pp. 73-93 (1969).
Byerlee, J. Friction, overpressure and fault normal compression. Geophys. Res. Lett 17, pp. 2109-2112 (1990).
Cosgrove, J.W. Hydraulic fracturing during the formation and deformation of a basin: a factor in the dewatering of low-permeability sediments. AAPG Bulletin 85, pp. 737-748 (2001).

(Continued)

*Primary Examiner* — Hugh Jones
(74) *Attorney, Agent, or Firm* — Meunier Carlin & Curfman LLC

(57) ABSTRACT

Disclosed are methods, systems, and computer readable media useful in determining pore pressure in a reservoir. Specifically disclosed are methods, systems, and computer readable media for determining mudstone permeability in mudstone bounding a reservoir.

13 Claims, 18 Drawing Sheets

(56) References Cited

OTHER PUBLICATIONS

Dickinson, G. Geological aspects of abnormal reservoir pressures in Gulf Coast Louisiana. AAPG Bulletin 37, pp. 410-432 (1953).

Dugan, et al. Fluid flow and stability of the US continental slope offshore New Jersey from the Pleistocene to the present. Geofluids 2, pp. 137-146 (2002).

Dugan, B. et al. Consolidation, effective stress, and fluid pressure of sediments from ODP Site 1073, US mid-Atlantic continental slope. Earth and Planetary Science Letters 215, pp. 13-26, 86 (2003).

Elsworth, D. et al. Dike intrusion as a trigger for large earthquakes and the failure of volcano flanks. Journal of Geophysical Research—All Series—100, pp. 6005-6005 (1995).

Flemings, P.B. et al. Pressure prediction in the Bullwinkle Basin through petrophysics and flow modeling (Green Canyon 65, Gulf of Mexico). Marine and Petroleum Geology 21, pp. 1311-1322 (2004).

Flemings, P.B. et al. Flow focusing in overpressured sandstones: Theory, observations, and applications. American Journal of Science 302, pp. 827-855 (2002).

Garenstroom, L. et al. Overpressures in the Central North Sea: implications for trap integrity and drilling safety. Geological Society, London, Petroleum Geology Conference series 4, pp. 1305-1313 (1993).

Gordon, D.S. et al. Generation of overpressure and compaction-driven fluid flow in a Plio-Pleistocene growth-faulted basin, Eugene Island 330, offshore Louisiana. Basin Research (1998) 10, pp. 177-196 (1998).

Harrison, W.J. et al. Paleohydrology of the Gulf of Mexico basin. American Journal of Science 291, pp. 109-176 (1991).

Holman, W.E. et al. Field development, depositional model, and production performance of the turbiditic "J" sands at prospect Bullwinkle, Green Canyon 65 field, outer-shelf Gulf of Mexico, Submarine Fans and Turbidite Systems: SEPM Foundation, Gulf Coast Section, 15th Annual Bob Perkins Research Conference. SEPM, pp. 425-437 (1994).

Hunt, J.M. Generation and Migration of Petroleum from Abnormally Pressured Fluid Compartments (1). AAPG Bulletin 74, pp. 1-12 (1990).

Long, H., et al. Consolidation and overpressure near the seafloor in the Ursa Basin, Deepwater Gulf of Mexico. Earth and Planetary Science Letters 305, pp. 11-20 (2011).

Mello, U.T., et al. A physical explanation for the positioning of the depth to the top of overpressure in shale-dominated sequences in the Gulf Coast basin, United States. Journal of Geophysical Research 99, pp. 2775-2789 (1994).

Powley, D. Pressures and hydrogeology in petroleum basins. Earth-Science Reviews 29, pp. 215-226, 87 (1990).

Prather, B. E. et al. Classification, lithologic calibration, and stratigraphic succession of seismic facies of intraslope basins, deepwater Gulf of Mexico: American Association of Petroleum Geologists Bulletin, v. 82, Issue 5A, pp. 701-728 (1998).

Prior, D.B. et al. Active slides and flows in underconsolidated marine sediments on the slopes of the Mississippi delta. Marine slides and other mass movements, pp. 21-49 (1982).

Reilly, M.J. et al. Deep pore pressures and seafloor venting in the Auger Basin, Gulf of Mexico. Basin Research 22, pp. 380-397 (2010).

Saffer, D.M. Pore pressure development and progressive dewatering in underthrust sediments at the Costa Rican subduction margin: Comparison with northern Barbados and Nankai. Journal of Geophysical Research 108, pp. 2261 (2003).

Seldon, B. et al. Reservoir pressure and seafloor venting: Predicting trap integrity in a Gulf of Mexico deepwater turbidite minibasin. AAPG Bulletin 89, pp. 193-209 (2005).

Spencer, C.W. Hydrocarbon generation as a mechanism for overpressuring in Rocky Mountain region. AAPG Bulletin 71, pp. 368-388 (1987).

Snedden, John W. et al. Reservoir Connectivity: Definitions, Strategies, and Applications: International Petroleum Technical Conference: IPTC 11375 MS, 7 pages and figures (2007).

Van Rensbergen, P. et al. The El Arraiche mud volcano field at the Moroccan Atlantic slope, Gulf of Cadiz. Marine Geology 219, pp. 1-17 (2005).

Yang, Y. et al. Definition and practical application of mudstone porosity—effective stress relationships. Petroleum Geoscience 10, pp. 153-162 (2004).

Yang, Y. et al. A permeability—porosity relationship for mudstones. Marine and Petroleum Geology 27, pp. 1692-1697 (2010).

Yardley, G.S. et al. Lateral transfer: a source of additional overpressure? Marine and Petroleum Geology 17, pp. 523-537 (2000).

RESERVOIR PRESSURE PREDICTION AND METHODS OF EXECUTION

CROSS REFERENCE TO RELATED APPLICATIONS

This application claims the benefit of priority to U.S. Provisional Application No. 61/871,298, filed Aug. 28, 2013, which is hereby incorporated by this reference in its entirety.

FIELD

The subject matter disclosed herein relates to methods, computer readable media, and systems or apparatuses for use in reservoir pressure prediction in oil and gas exploration. In particular, the disclosed subject matter provides methods, computer readable media, and apparatuses and systems for more effectively and efficiently predicting pore pressure.

SUMMARY

Disclosed herein is a method of predicting reservoir pore pressure comprising determining mudstone pressure in mudstone bounding the reservoir; determining the mudstone permeability; establishing a structural model for reservoir structure; using these parameters to determine a depth where reservoir pressure equals mudstone pressure; and extrapolating these results in order to predict reservoir pore pressure.

Also disclosed is a method of predicting reservoir overpressure using the equation:

$$u^*_{res} = \frac{\int_A k_{ms} u^*_{ms} dA}{\int_A k_{ms} dA}$$

where $u^*_{res}$ is reservoir overpressure, $k_{ms}$ is intrinsic permeability of the mudstone, $u^*_{ms}$ is mudstone overpressure, and dA represents the area of the reservoir associated with a particular mudstone permeability. Reservoir overpressure $u^*_{res}$ is equal to $u_{res}-\rho_w gz$, where $u^*_{res}$ is the reservoir overpressure, $\rho_w$ is the density of water, g is gravitational force, and z is depth below sealevel.

Further disclosed is a computer readable storage medium including code executed by a process to perform method steps for predicting reservoir pore pressure, the method steps comprising: determining mudstone permeability in mudstone bounding the reservoir; establishing a structural model for reservoir structure; using these parameters to determine a depth where reservoir pressure equals mudstone pressure; and extrapolating these results in order to predict reservoir pore pressure.

Also disclosed is a system for predicting reservoir pore pressure, comprising: an apparatus adapted for determining mudstone pressure and/or permeability in mudstone bounding the reservoir; an apparatus adapted for establishing a structural model for the reservoir; and an apparatus adapted for using these parameters to determine the depth where reservoir pressure equals mudstone pressure, and extrapolating results in order to predict reservoir pore pressure.

Depending on the reservoir pressure determined by the disclosed method, the casing depth (also called casing point) can be calculated and the casing can be placed in a bore hole to the calculated casing depth. The reservoir pressure can also be used to calculate the appropriate density of the drilling mud weight and a mud having said appropriate density can be prepared and placed down the borehole. The reservoir pressure can also be used to relocate the position or trajectory of the well.

BRIEF DESCRIPTION OF THE DRAWINGS

The accompanying drawings, which are incorporated in and constitute a part of this specification, illustrate several embodiments of the disclosed subject matter and together with the description, serve to explain the principles of the invention.

DETAILED DESCRIPTION

Figure 1:
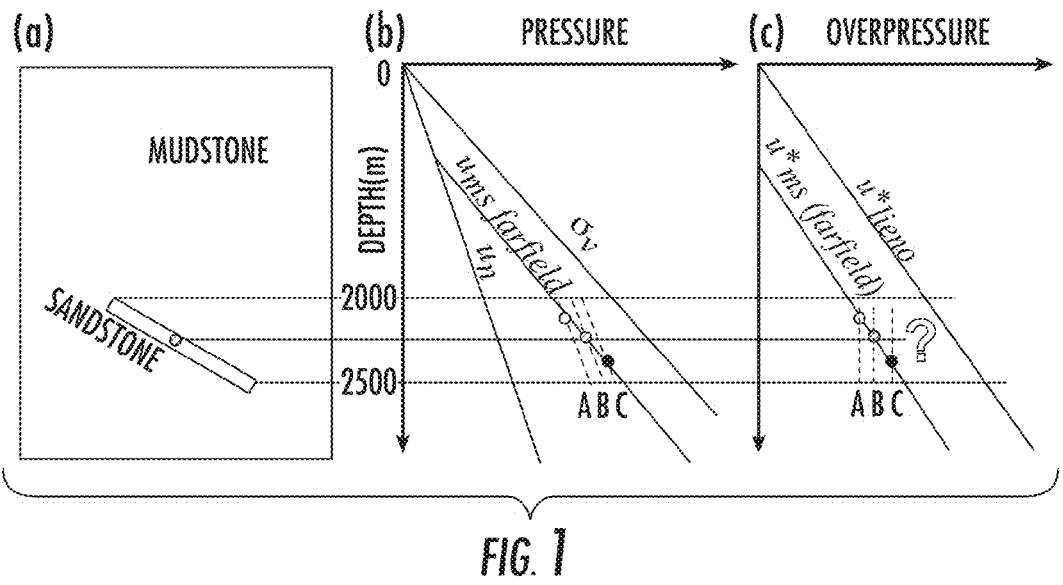
FIGS. 1 (a)-(c) show a pressure system around a dipping reservoir. (a) shows a dipping sandstone reservoir is encased in mudstone. The crest of the reservoir is at 2000 m and the base of the reservoir is at 2500 m. The mid-point of the dipping reservoir is shown. (b) shows that in the sandstone, the pressure gradient follows hydrostatic pressure gradient whereas the mudstone has a higher pressure gradient. A practical question is what the pore pressure is within the sandstone. (c) shows the corresponding overpressure plot (where the overpressure, $u^*_{res}$, is equal to the reservoir pressure less the hydrostatic pressure or $u_{res}-\rho_w g$).

Reference will now be made in detail to the present preferred embodiments of the invention, an examples of which are illustrated in the accompanying drawings. Wherever possible, the same reference numbers are used throughout the drawings to refer to the same or like parts.

Definitions

The present invention may be understood more readily by reference to the following detailed description of preferred embodiments of the invention and the Examples included therein and to the Figures and their previous and following description.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Pore pressure" is the pressure of fluids within the pores of a reservoir. Pressure can be hydrostatic, or the pressure exerted by a column of water from the formation's depth to sea level. When low permeability rocks such as mudstones are compacted, their pore fluids cannot always escape and must then support the total overlying rock column, leading to anomalously high formation pressures.

"Overpressure" is subsurface pressure that is abnormally high, exceeding hydrostatic pressure at a given depth. Abnormally high pore pressure can occur in areas where burial of fluid-filled sediments is so rapid that pore fluids cannot escape, so the pressure of the pore fluids increases as overburden increases. Drilling into overpressured strata can be hazardous because overpressured fluids escape rapidly, so careful preparation is made in areas of known overpressure.

"Permeability" is the ability, or measurement of a rock's ability, to transmit fluids, typically measured in darcies or millidarcies. Formations that transmit fluids readily, such as sandstones, are described as permeable and tend to have many large, well-connected pores. Impermeable formations, such as shales and siltstones, tend to be finer-grained or of a mixed grain size, with smaller, fewer, or less interconnected pores. Absolute permeability is the measurement of the permeability conducted when a single fluid, or phase, is present in the rock.

"Porosity" is defined as the percentage of pore volume or void space, or that volume within rock that can contain fluids. Porosity can be a relic of deposition (primary porosity, such as space between grains that were not compacted together completely) or can develop through alteration of the rock (secondary porosity, such as when feldspar grains or fossils are preferentially dissolved from sandstones). Porosity can be generated by the development of fractures, in which case it is called fracture porosity. Effective porosity is the interconnected pore volume in a rock that contributes to fluid flow in a reservoir. Total porosity is the total void space in the rock whether or not it contributes to fluid flow.

"Sandstone" is defined as a clastic sedimentary rock whose grains are predominantly sand-sized. The term is commonly used to imply consolidated sand or a rock made of predominantly quartz sand, although sandstones often contain feldspar, rock fragments, mica and numerous additional mineral grains held together with silica or another type of cement. The relatively high porosity and permeability of sandstones make them good reservoir rocks.

"Mudstone" or "mudrocks" are composed of silt and clay with more than half of the rock composed of clay-sized particles. The clay-silt cutoff is 2 microns (0.002 mm). Silt size cutoff is up to 0.0625 mm (0.0025 in).

A "bit" is the cutting or boring element used in drilling oil, gas, or water wells.

A "reservoir" a subsurface, porous, permeable rock body in which oil, gas, or water are stored. Most reservoir rocks are limestones, dolomites, sandstones, or a combination of these. The four basic types of hydrocarbon reservoirs are oil, volatile oil, dry gas, and gas condensate. An oil reservoir generally contains three fluids: gas, oil, and water.

"Seismic" is defined as a tool that is surfaced based or in the borehole for identifying underground accumulations of oil or gas by sending energy waves or sound waves into the earth and recording the wave reflections. Results indicate the type, size, shape and depth of subsurface rock formations. 2-D seismic provides two-dimensional information while 3-D creates three-dimensional pictures.

"Oil sands" is defined as a complex mixture of sand, water and clay trapping very heavy oil known as bitumen.

A "sedimentary basin" is a thick accumulation of sediments within which hydrocarbons can be found.

Methods and Systems

Referring to FIG. 1, forward modeling is used to study how mudstone permeability controls the pore pressure in sand bodies. It is shown herein that when dipping, linear, two dimensional aquifers (in this case sandstone) are surrounded by constant permeability mudstone (FIG. 1a), the pore pressure of the sandstone equals the pore pressure of the mudstone at the midpoint depth. In contrast, for the same geometry, when the permeability of the mudstone is a function of stress, the pore pressure in the sandstone equals the pore pressure in the mudstone at a higher depth. The reason for this is that mudstone is more compressed and has lower permeability at the base of the structure. As a result, less of the higher pressures present at deep depth contribute to the sandstone pressure. The subject matter disclosed herein show that one can determine the reservoir pore pressure when the mudstone properties are known. This static model successfully predicts in-situ pressure in reservoirs and results in a equal pressure depth (the depth where the sandstone and mudstone are equal) approximately ⅓ the depth of the structure.

Disclosed herein is a method of predicting reservoir pore pressure, comprising determining mudstone permeability in mudstone bounding the reservoir; establishing a structural model for reservoir structure; using these parameters to determine the depth where reservoir pressure equals mudstone pressure; extrapolating the results in order to predict reservoir pore pressure; designing an appropriate casing plan for the well based on the predicted reservoir pressure; and choosing an appropriate mud weight to drill the well with. With reservoir pore pressure predicted, a casing depth can be determined and a casing can be inserted into a borehole in the reservoir at the casing depth, and/or a drilling fluid (drilling mud) can be prepared so that the fluid/mud's density is suitable for the predicted reservoir pore pressure. Also the drilling path can be changed based on the predicted reservoir pore pressure.

The well location will often penetrate permeable reservoirs. Pore pressure at a given well location can be determined ahead of a bit. This can be done, for example, to extract petroleum which lies in rock formations beneath the seabed. The methods and apparatuses disclosed herein can be used with bottom founded drilling rigs (jackup barges and swamp barges), combined drilling and production facilities either bottom founded or floating platforms, and deepwater mobile offshore drilling units (MODU) including semi-submersibles and drill ships.

A drilling operation can be adjusted based on the predicted reservoir pore pressure. For example, adjusting the drilling operation can comprise at least one adjustment elected from a group consisting of adjusting a drilling fluid density, adjusting a drilling trajectory, moving a well location, and optimizing a number of casing strings in a borehole. A "well location" can mean any reservoir or potential reservoir, or a specific location below an operating drill bit in a borehole.

Overpressure can be generated by mechanisms including mechanical loading by sedimentation (Brehoeft, J. D. et al. Geological Society of America Bulletin Vol 79, p. 1097-1106 (1968); Harrison W. J. et al. American Journal of Science Vol 291, p. 109-176 (1991)), hydrocarbon generation (Barker, C. AAPG Bulletin Vol 74, p. 1254-1261 (1990); Law, B. E. et al. Memoir 70, Chapter 1: Abnormal Pressure in Hydrocarbon Environments (1998); Spencer, C. W. AAPG Bulletin Vol 71, p. 368-388 (1987)), volume change of pore fluid due to temperature change (Barker. AAPG Bulletin Vol 56, p. 2068-2071 (1972); Powley, D. Earth-Science Reviews Vol 29, p. 215-226 (1990)), and diagenetic reactions that produce pore fluid (Bruce, C. H. AAPG Bulletin Vol 68, p. 673-683 (1984); Burst, J. F. AAPG Bulletin Vol 53, p. 73-93 (1969)). In the Gulf of Mexico and other basins with rapid deposition of mudstone, overpressure is mainly generated by mechanical loading due to sedimentation (Gordon, D. S. et al. Basin Research Vol 10, p. 177-196 (1998); Harrison, W. J. et al. American Journal of Science Vol 291, p. 109-176 (1991)). High sedimentation rates, high sediment compressibility and low permeability result in inefficient drainage of pore fluids (Gibson. The progress of consolidation in a clay layer increasing in thickness with time (1958)). Under these conditions, the fluid supports part of the overlying load and pore pressure exceeds the hydrostatic pressure.

Laterally continuous permeable aquifers within overpressured mudstones impact flow, pore pressure distribution, and geological processes. Permeable aquifers have a hydrostatic pore pressure gradient, whereas the surrounding mudstone can have a higher pore pressure gradient. Flemings et al. (American Journal of Science Vol 302, p. 827-855 (2002)) documented this behavior with field examples and presented a model to describe how flow is focused along the permeable aquifer from regions of high pressure and large overburden stress towards regions of lower overpressure and less overburden stress. They showed that in many overpressured systems, the low permeability mudstone bounding the reservoir follows the lithostatic gradient whereas the reservoir, if permeable and well connected to regional sandstones, follows the hydrostatic gradient (e.g., FIG. 1b).

Pore pressure prediction requires the determination of what the pore pressure is within a large regional reservoir that is exposed to overpressured mudstone where the mudstone overpressure can vary substantially (FIG. 1c). However, it is generally understood that most pore pressure prediction approaches, whether done by well log measurements, or remotely by seismic measurements, provide pore pressure predictions for the low permeability mudstone that surrounds the reservoir, rather than the reservoir itself. The methods disclosed herein takes the mudstone predictions and then uses them to predict reservoir pressure. It is desirable in well design to be able to predict the pressure in the permeable reservoir, because the fluid will flow into the well bore if pressures encountered are too high, which could lead to a blow out, and lost circulation will occur if the pressures encountered are too low, which could lead to a loss of the well. With an accurately predicted reservoir pressure, one can then determine a casing depth (which the practitioner would then apply a casing to the determined depth in a bore hole through the reservoir) and appropriate mud weight (which the practitioner would accordingly prepare and add to the well). Lupa and Flemings (Marine and Petroleum Geology Vol 21, p. 1311-1322 (2004)) suggested that under the conditions where the overpressure in the mudstone varied linearly with depth, the pore pressure within the reservoir could be estimated by determining the mudstone pressure at the area-averaged depth of the sandstone. The approach can be applied in both two and three dimensions (Flemings et al. Marine and Petroleum Geology Vol 21, p. 1311-1322 (2004)). This approach was grounded in theoretical modeling that demonstrated that rate of flow into the sand was controlled by the difference between the reservoir and the mudstone pressure. A key limitation of this approach was that it assumes that the mudstone permeability is homogenous and isotropic, despite the fact that there are large changes in vertical effective stress within these systems.

Disclosed herein is a method and work flow that predicts reservoir pressure based on an estimate of the mudstone pressure, the geometry of the reservoir, and estimate of mudstone permeability. As shown in Example 1, mudstone permeability controls the pore pressure present in sandstone reservoirs. The effect of mudstone permeability variation, stress conditions, reservoir structural relief, and lithological properties on how they control fluid flow, and the reservoir overpressure is also disclosed herein. The model used was verified by comparing it to basin modeling results and field pressure observations in the Bullwinkle Basin, Gulf of Mexico.

Based on the flow balance concept, reservoir overpressure can be determined by both mudstone permeability and mudstone overpressure. This can be shown in integral form:

$$u^*_{res} = \frac{\int_A k_{ms} u^*_{ms} \, dA}{\int_A k_{ms} \, dA} \quad (1)$$

where $u^*_{res}$ is reservoir overpressure, $k_{ms}$ is intrinsic permeability of the mudstone, $u^*_{ms}$ mudstone overpressure, and dA represents the area of the reservoir at a particular depth.

Figure 2:
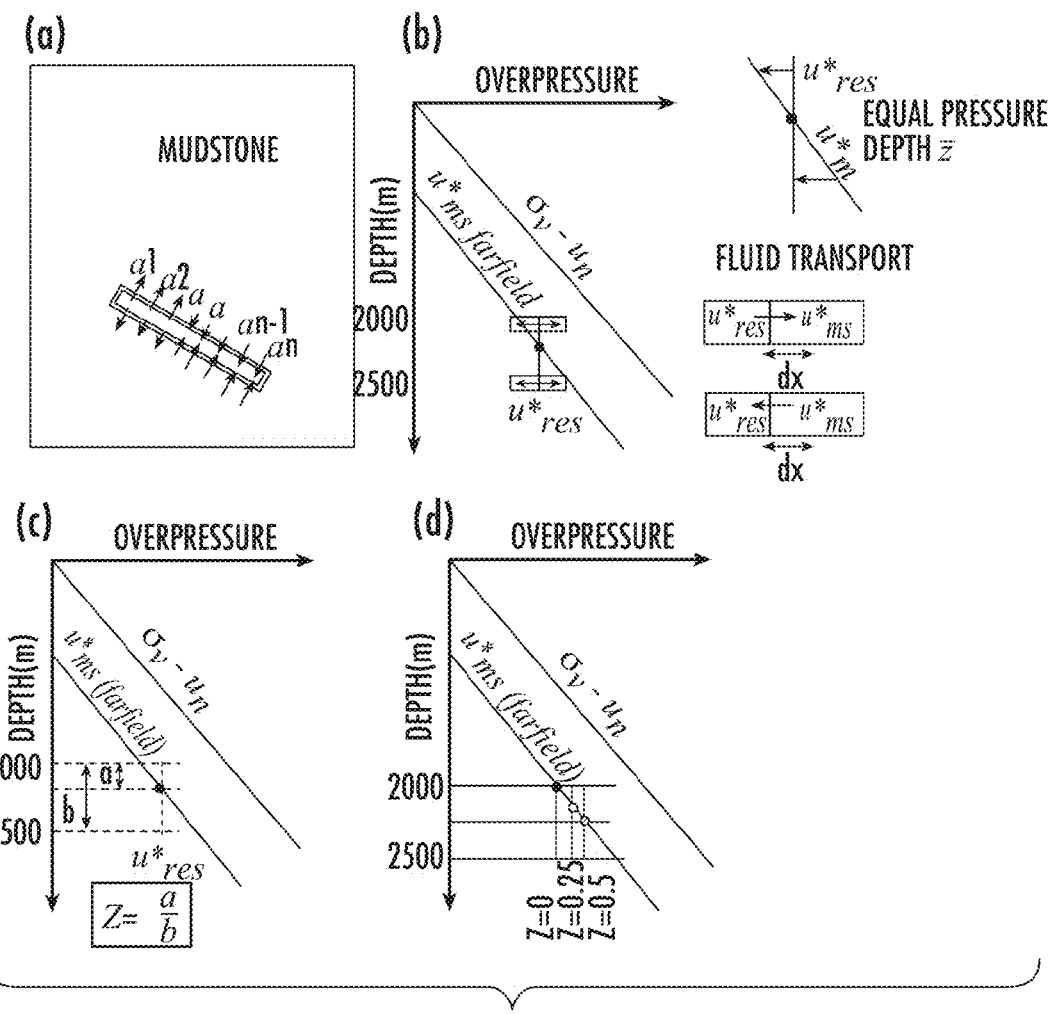
FIGS. 2 (a)-(d) show the static model and Z parameter. (a) shows a dipping reservoir encased in mudstone. (b) shows that above the depth where reservoir overpressure equals mudstone overpressure (equal pressure depth), fluid flows from the reservoir to the mudstone; below the equal pressure depth, fluid flows from the mudstone into the reservoir; (c) is the definition of Z parameter; (d) shows that the higher the Z value, the lower the equal pressure depth.

Referring to FIG. 2, overpressure in the mudstone surrounding the reservoir differs from overpressure in the farfield mudstone. The overpressure gradient of the farfield mudstone is usually parallel to the reduced lithostatic pressure gradient. However, in proximity to a high permeability reservoir, the mudstone connected to the reservoir no longer follows the reduced lithostatic pressure gradient. The mudstone connected to the reservoir follows the reservoir overpressure. As the distance between the mudstone and reservoir increases, the reservoir effect diminished and the mudstone overpressure gradient gradually falls back to follow the reduced lithostatic pressure gradient.

The rock compacts when the effective stress increases (effective stress is the overburden stress (sigmav) less the pore pressure (u)). In a dipping reservoir, the effective stress is least at the top of the reservoir and most at the bottom of the reservoir. Because the mudstone near the reservoir has a pressure near or equal to the reservoir pressure, this means that the effective stress at the top of the reservoir is small and the effective stress at the base of the reservoir is large in the mudstone. As a result, the mudstone at the base is much more compacted than the mudstone at the crest. The more compacted rock has a lower permeability. Thus, a characteristic mudstone permeability variation exists around a dipping reservoir: mudstone permeability is lower near the base of the reservoir and higher near the crest of the reservoir. Near the reservoir base, the fluid drains from the deep high-pressured mudstone into the reservoir (Flemings et al. American Journal of Science Vol 302, p. 827-855 (2002)). As a result, the mudstone consolidates, and permeability becomes lower. Near the reservoir crest, the fluid escapes from the reservoir into the mudstone. Because of the high pressure fluid flow from the deeper depth, the mudstone at the crest cannot be consolidated efficiently. This characteristic mudstone permeability variation causes the reservoir to become more isolated from the deeper overpressure zone and more connected to the shallower overpressure zone.

Figure 3:
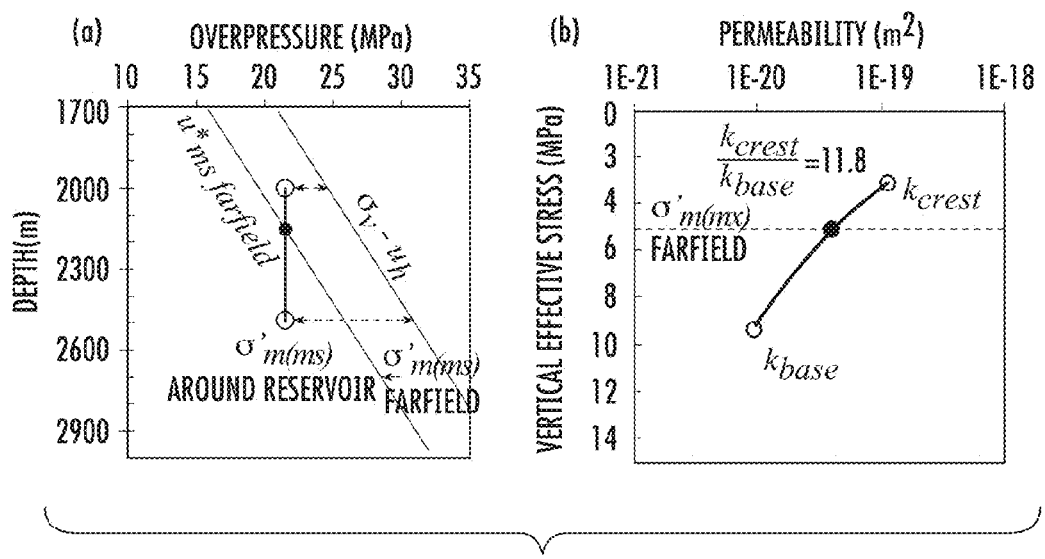
FIGS. 3 (a) and (b) show an example case. (a) shows an overpressure plot. Round circles show the crest and bottom depths of the reservoir structure. The black line indicates the reduced lithostatic pressure. Grey line shows the overpressure in the farfield. The dot shows the calculated equal pressure depth. (b) shows a permeability plot. Around the dipping reservoir, the permeability in the mudstone decreases by about a factor of 11.8 from the crest to the base of the reservoir. The grey dash line shows the farfield mudstone vertical effective stress (5 MPa). The mudstone permeability in the farfield is about 4E−20 m2.

Referring to FIG. 3, the depth where reservoir pressure equals farfield mudstone pressure is controlled by the mudstone permeability contrast kr. When one considers the effects of mudstone farfield vertical effective stress, reservoir structural relief, and mudstone compressibility, the key step is to analyze the permeability change of the mudstone that surrounds the reservoir. High reservoir structural relief and high mudstone compressibility lead to high permeability contrast; these conditions result in a shallower depth where reservoir pressure equals mudstone pressure. On the contrary, high stress conditions lead to low permeability contrast, consequently, the depth where reservoir pressure equals mudstone pressure is deeper.

Figure 20:
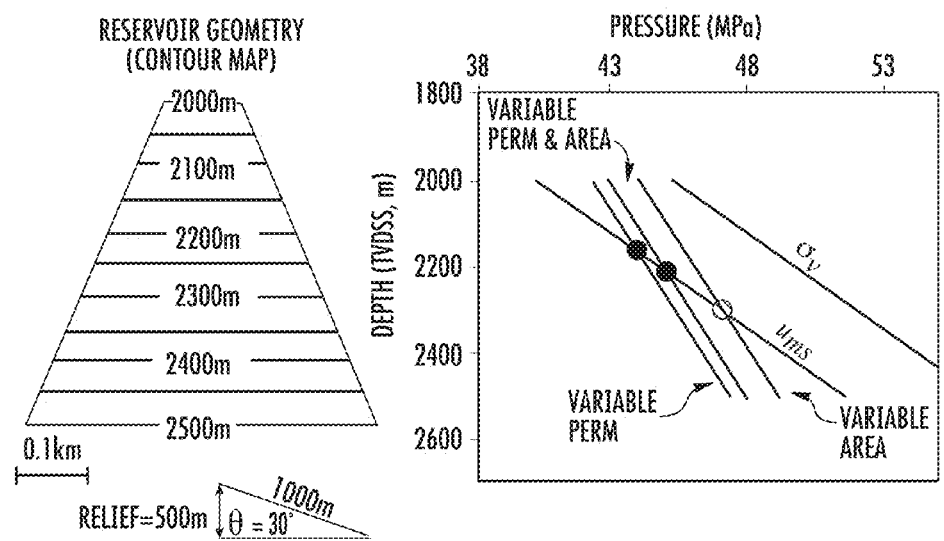
FIG. 20 is an illustration of the effect of different reservoir areas on pore pressure prediction. In the example shown in the figure, the reservoir has a greater area, at a deeper depth, as is common in turbidite systems. Under such a scenario, more pressure at depth drives the reservoir pressure. Both mudstone permeability and reservoir area are used to predict reservoir pressure.
Figure 21:
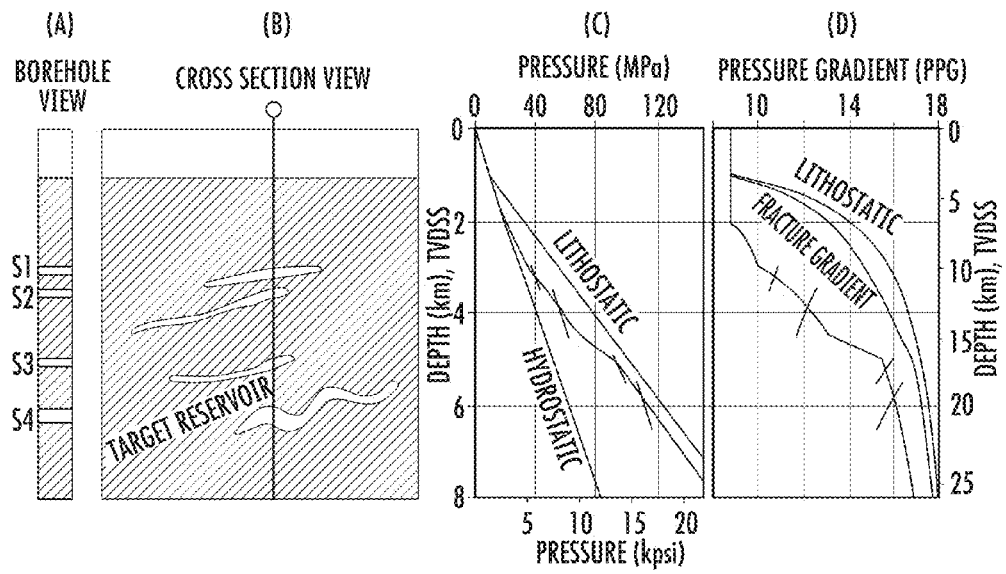
FIG. 21(a) shows sandstone layers (S1, S2, S3, S4) in a borehole view. The layers represent sandstone and the grey layers represent mudstone. (b) is a cross section view showing the 2D extension of the layers. The line shows the well path (borehole). The light shading shows the hydrocarbon accumulation. The borehole is located so that it will penetrate these reservoirs at a series of points. (c) is a pressure plot. The light line, grey line and black line are the hydrostatic pressure, farfield mudstone pressure, and lithostatic pressure respectfully. The dash line shows traditional mudstone pressure prediction techniques along the drilling path. The reservoir pressure is predicted according to the processes described herein (shaded lines) (d) is the pressure prediction expressed as a pressure gradient (mud weight) plot. The grey line is the farfield mudstone pressure gradient and the black line is the lithostatic pressure gradient. The black dash line is the fracture pressure gradient with assumption of $k_o$=0.8. From this, the user chooses an appropriate mud weight to drill the well and chooses appropriate casing points to design the well.

Again referring to FIG. 1, a sketch is shown which represents a pressure system around a dipping reservoir. This is discussed in more detail in Example 1. A 2D rectangle shape was assumed for the reservoir geometry. A different geometry leads to a different depth where reservoir pressure equals mudstone pressure (FIG. 20). For example, a fan-shaped reservoir tends to have more area exposed to the high overpressure zone because of its characteristic depositional geometry (Prather, B. E. et al. American Association of Petroleum Geologists Bulletin, Vol 82, Issue 5A. p. 701-728 (1998)). In cases with complex geometry, the flow balance equation can account for the geometry effect in calculating the permeability variation (k), and then the depth is obtained where reservoir pressure equals mudstone pressure.

Referring to FIG. 2, a static model according to the methods disclosed herein was used to study the effect of permeability variation on overpressure and the relationship of sandstone and mudstone overpressure. The depth where reservoir pressure equals mudstone pressure is controlled by the permeability contrast of the mudstone that surrounds the reservoir. A high mudstone permeability contrast leads to a shallower depth where reservoir pressure equals mudstone pressure and a low permeability contrast leads to a deeper equal pressure depth. High reservoir structural relief, low far-field mudstone vertical effective stress, and high mudstone compressibility are all likely to generate a high mudstone permeability contrast around the reservoir.

Figure 5:
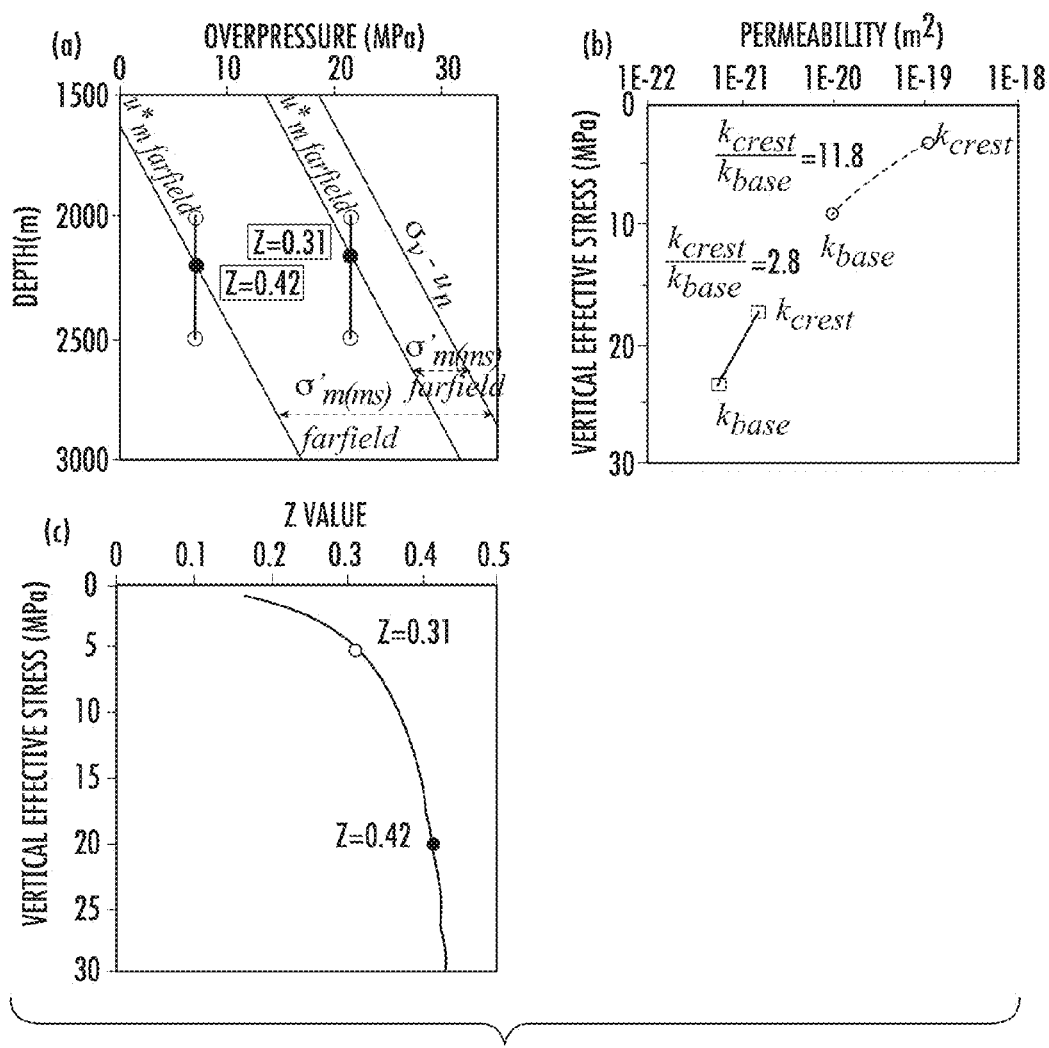
FIGS. 5 (a)-(c) show the effect of vertical effective stress level on permeability changes and the equal pressure depth. (a) shows overpressure plot. Lower farfield overpressure (hence higher farfield vertical effective stress) leads to a greater equal pressure depth compared to higher farfield overpressure (lower farfield vertical effective stress). (b) shows permeability versus vertical effective stress plot. The higher farfield vertical effective stress leads to a much smaller permeability decrease around the reservoir than the lower farfield vertical effective stress, (factor of 2.8 vs. 11.8 respectively). (c) shows the location of the Z parameter. The higher the farfield vertical effective stress, the higher the Z value and hence, the greater the equal pressure depth.

Referring to FIG. 5, the effect of vertical effective stress level on permeability and the equal pressure depth can be seen. Lower farfield overpressure leads to a greater equal pressure depth compared to a higher farfield overpressure. A higher farfield vertical effective stress can lead to a much smaller permeability decrease around the reservoir than the lower farfield vertical effective stress. Therefore, effective vertical stress of mudstone, such as that surrounding a well location, can be used to determine mudstone permeability.

Figure 6:
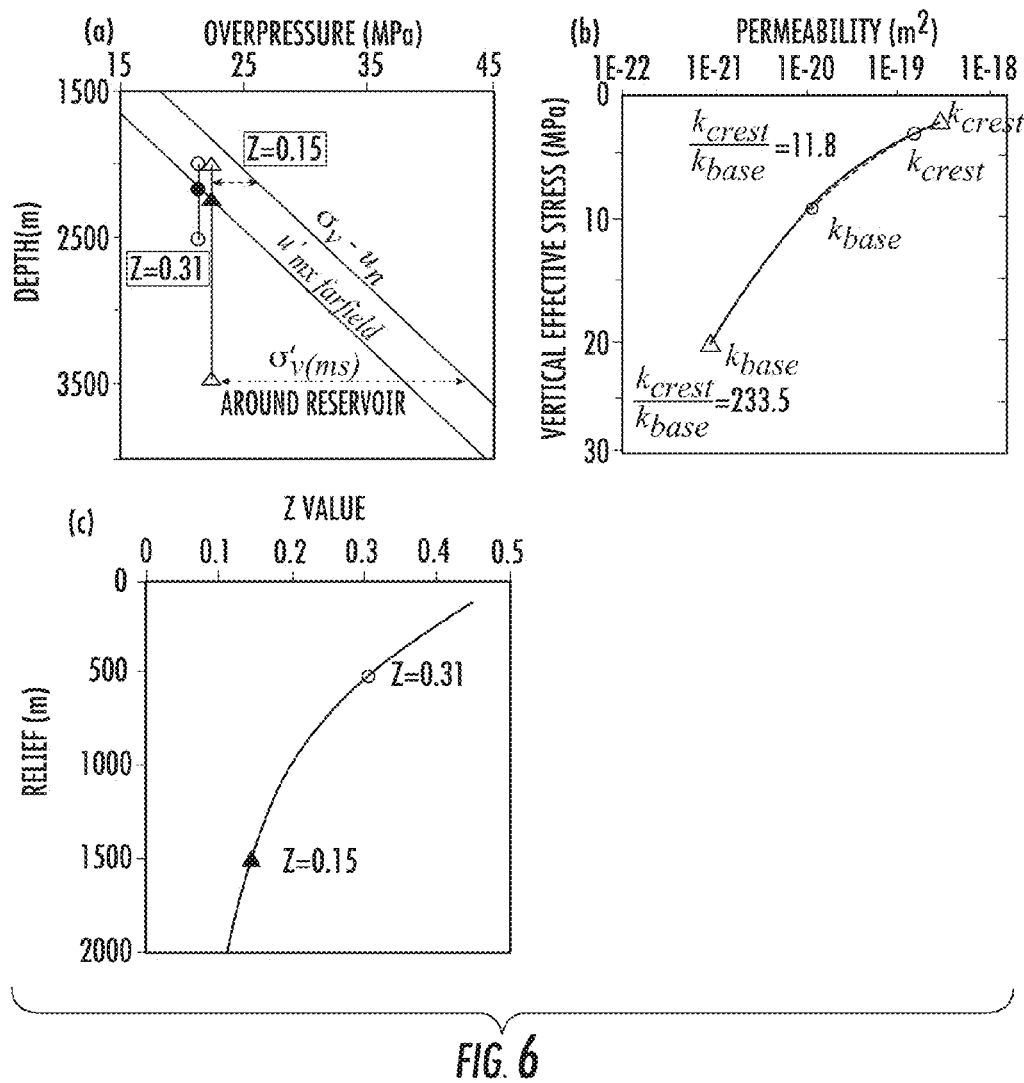
FIGS. 6 (a)-(c) shows structural relief on permeability changes and the equal pressure depth. (a) shows an overpressure plot. The higher the structural relief, the shallower the equal pressure depth (b) shows a permeability versus vertical effective stress plot. The permeability change around the reservoir increases dramatically with the increase in the structural relief (kr=233.5). (c) shows Z parameter versus reservoir structural relief. The higher the structural relief, the lower the Z value and so the shallower the equal pressure depth.

Referring to FIG. 6, structural relief (the vertical distance from the top of the reservoir to the base of the reservoir) also has an effect on the permeability changes and the equal pressure depth. By "equal pressure depth" is meant the depth where the reservoir pressure equals the far-field mudstone pressure. Establishing a structural model includes using structural relief to determine the deepest depth and shallowest depth of the sandstone well location. The higher the structural relief, the shallower the relative depth where the mudstone and reservoir are equal (see FIG. 2). The permeability change around a reservoir increases dramatically with the increase in the structural relief Establishing a structural model can also include using seismic interpretations. As discussed in Example 1, the structural model can include two- or three-dimensional cross sections.

Figure 7:
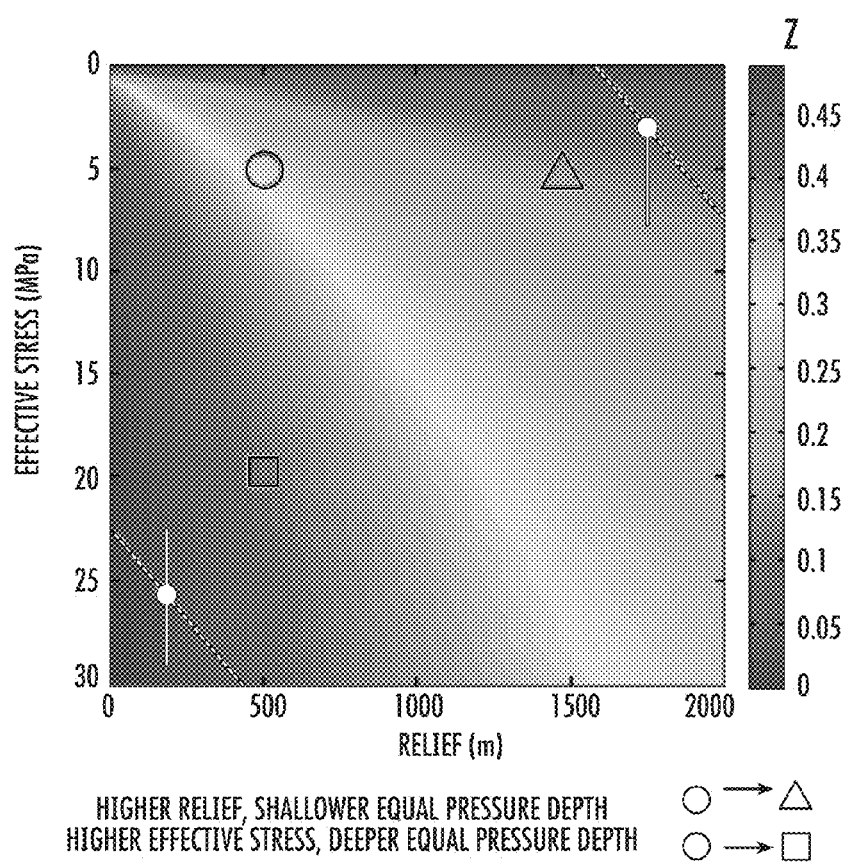
FIG. 7 shows an equal pressure depth nomogram. Location of the Z parameter as a function of the reservoir structural relief and the farfield vertical effective stress. Darker shades indicate a higher Z value and greater equal pressure depth, and vice versa. The circle marker shows that for the case with 500 m relief and 5 MPa farfield vertical effective stress, the equal pressure depth is at about ⅓ of the reservoir structure (Z=0.31). The triangle shows that for the case with 1500 m relief and 5 MPa farfield vertical effective stress, the equal pressure depth is at a depth of about ⅐ of the reservoir structure (Z=0.15). The square marker shows that for the case with 1500 m relief and 20 MPa farfield mudstone vertical effective stress, the equal pressure depth is at a depth of ⅖ of the reservoir structure (Z=0.43).

Referring to FIG. 7, an equal pressure depth nomogram is shown. The nomogram is constructed to determine the depth where reservoir pressure equals mudstone pressure based on the farfield mudstone vertical effective stress and structural relief. The nomogram illustrates that the higher the relief, the shallower the depth where reservoir pressure equals mudstone pressure, whereas the higher the farfield mudstone vertical effective stress, the lower the equal pressure depth.

Figure 10:
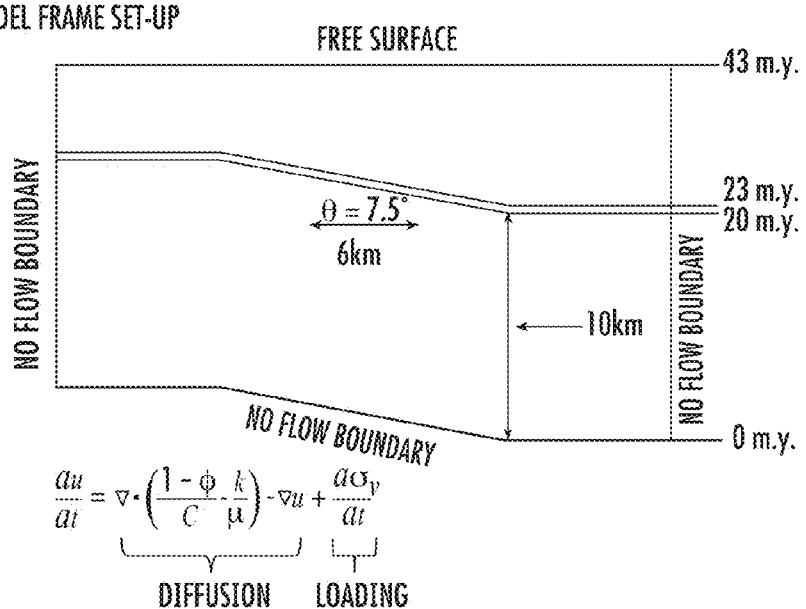
FIG. 10 shows a basin model frame set-up. A 10 km thick mudstone was deposited from 0 m.y. to 20 m.y. A sandstone layer about 300 m thick and 6 km long (bounded with mudstone at both sides) was deposited from 20 m.y. to 20 m.y. The mudstone was buried and tilted by the overlying mudstone. The sea floor is a free surface boundary whereas the sides are no flow boundaries.
Figure 10:
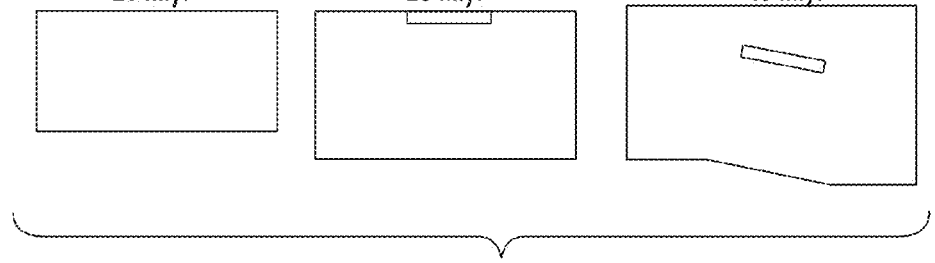
Figure 11:
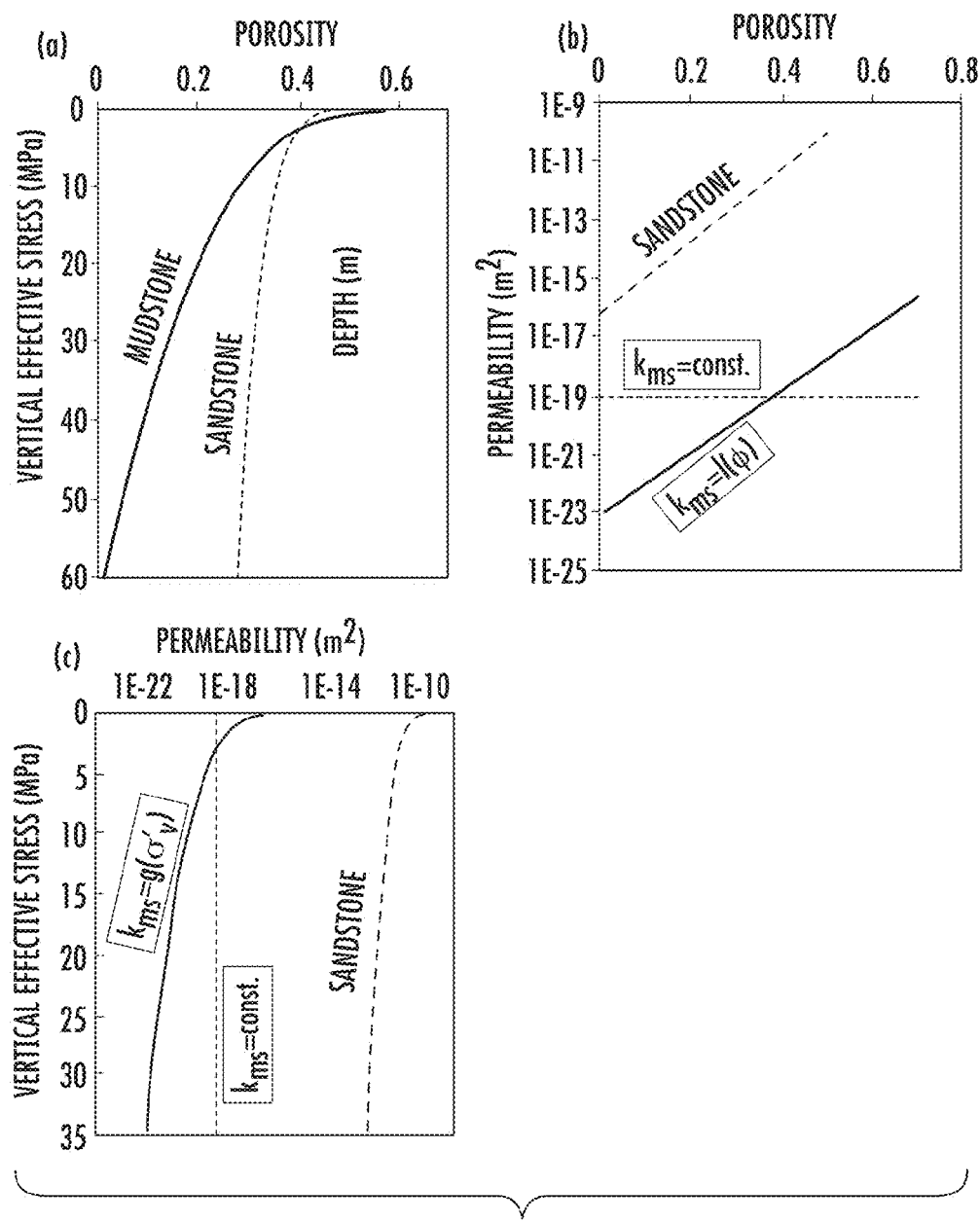
FIGS. 11 (a)-(c) show the lithology properties of basin models. (a) shows the compression behavior of the sandstone and mudstone in the basin model. (b) shows the permeability as a function of porosity for the constant permeability mudstone (dotted line), the variable permeability mudstone (solid line) and the sandstone (dashed line). (c) shows the permeability is a function of effective stress (combine (a) and (b)).
Figure 12:
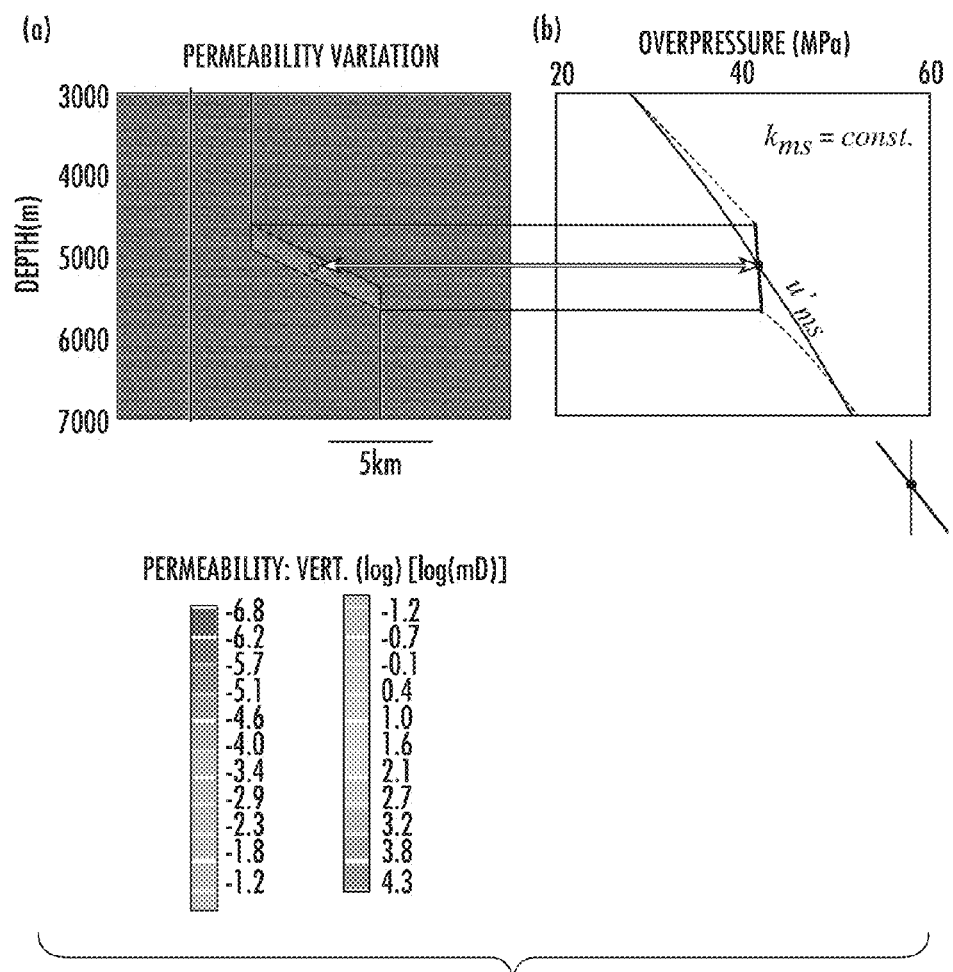
FIGS. 12 (a) and (b) show a basin model (constant permeability). (a) shows permeability variation. The mudstone permeability is kept constant. (b) shows the overpressure plot. The equal pressure depth is at the midpoint of the structure.
Figure 13:
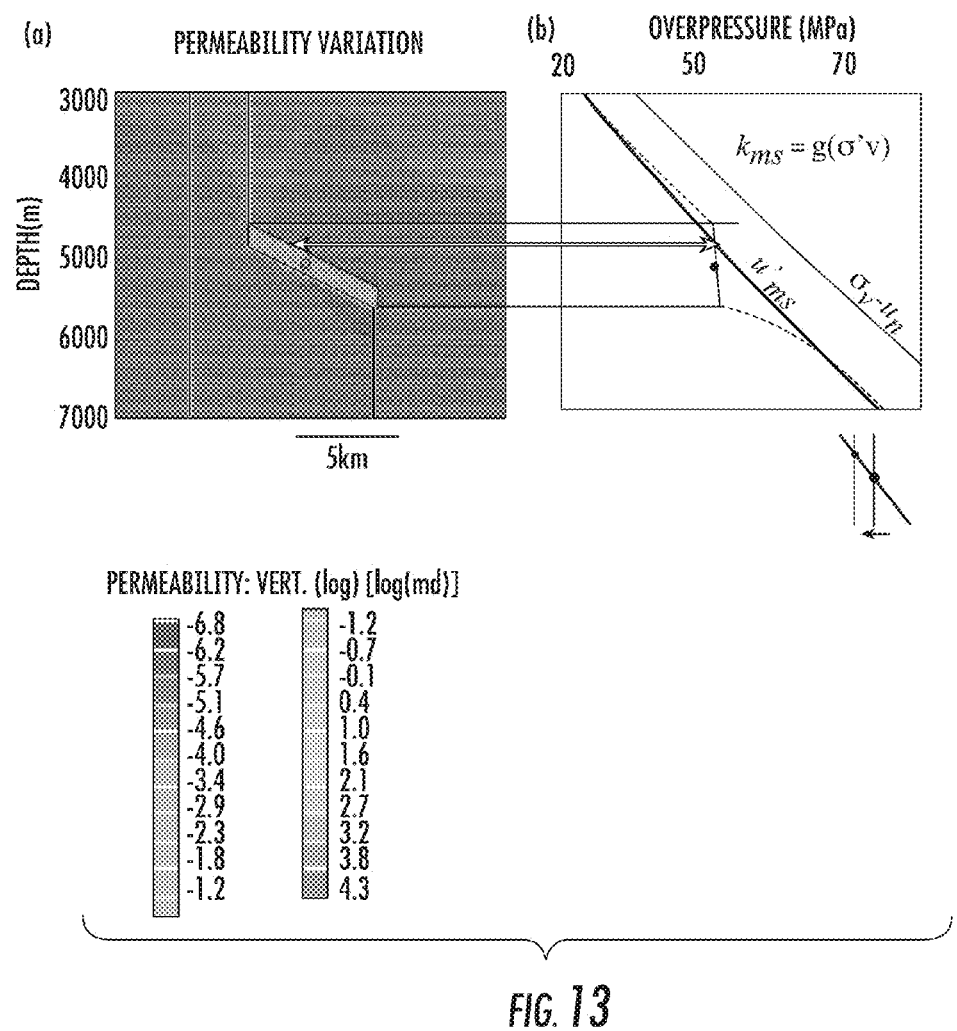
FIGS. 13 (a) and (b) show a basin model (variable permeability). (a) show permeability variation. Mudstone permeability is decreased (darker) around the base of the reservoir and increased (lighter) around the crest of the reservoir. (b) shows an overpressure Plot. The equal pressure depth is at ¼ depth of the reservoir relief.
Figure 14:
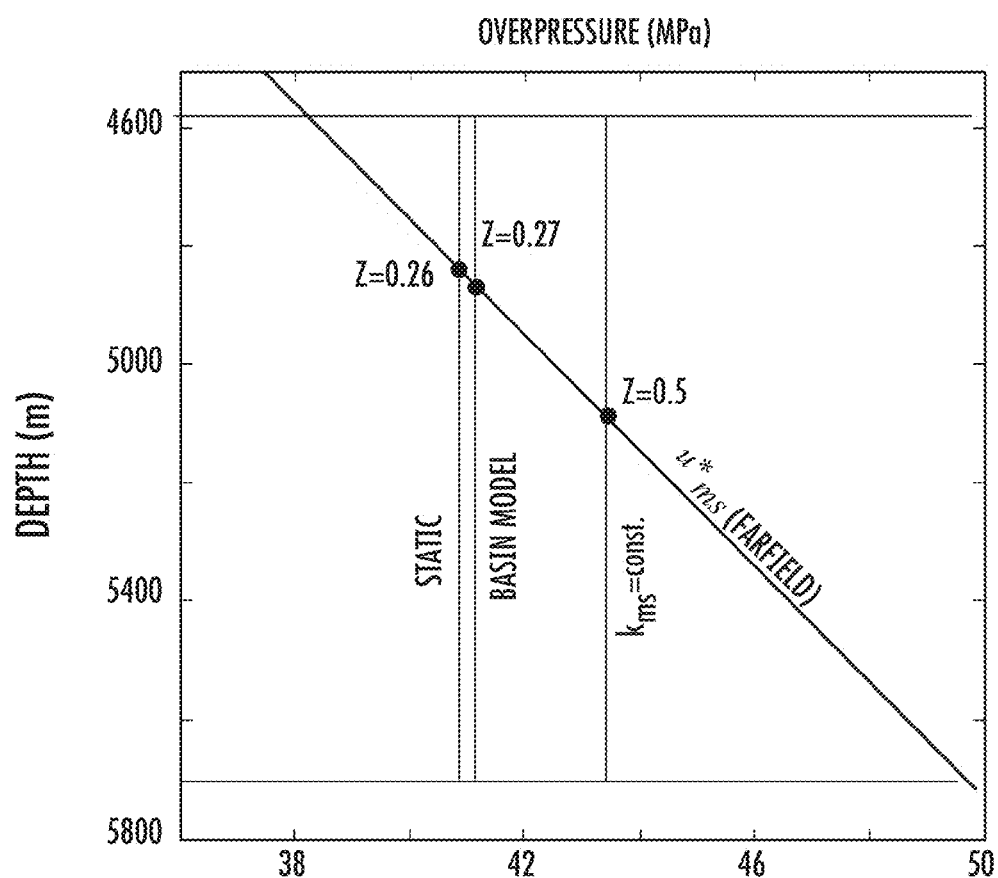
FIG. 14 shows a model results comparison. The basin model (a complex and lengthy process is pursued occasionally in the energy industry) results in a predicted pore pressure that is extremely similar to the one described by the static model (the method disclosed herein). The Z parameter, the relative depth where reservoir pressure and mudstone pressure are equal, predicted from the basin model and static model are 0.27 and 0.26, respectfully.

Referring to FIG. 10, basin models were also constructed to characterize the permeability variation around the dipping reservoir and its effect on reservoir overpressure. It was found that when mudstone permeability is constant, the reservoir overpressure equals to the farfield overpressure at the mid-point of the structure. When mudstone permeability is a function of vertical effective stress, the depth where reservoir pressure equals mudstone pressure is shallower than the mid-point of the structure. FIG. 11 shows lithography properties of basin models. FIGS. 12 and 13 show the basin model at constant permeability and variable permeability, while FIG. 14 shows a comparison of these models.

Figure 15:
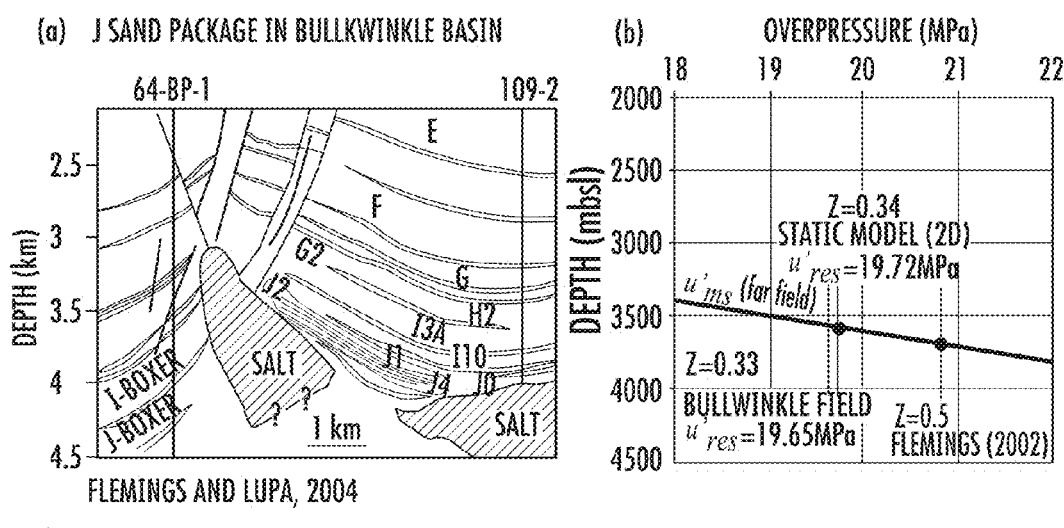
FIGS. 15 (a) and (b) shows a comparison of the static model method disclosed herein with field observations. (a) shows cross section of the Bullwinkle mini basin, showing the J sand reservoir. (b) shows the static model closely predicts the field pressure observation.
Figure 16:
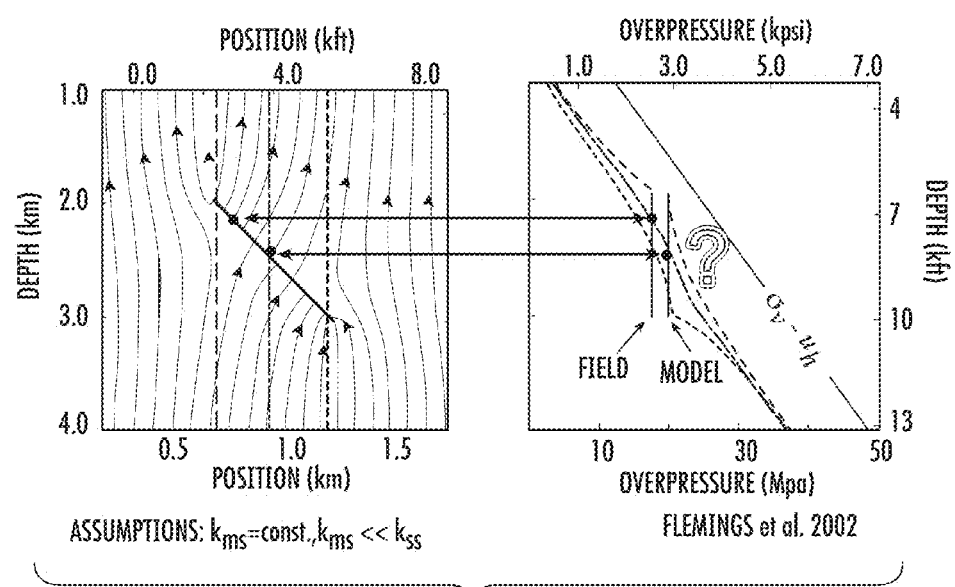
FIG. 16 shows a steady flow model of pressures equal at mid-point (2D). The problem is that field observations show a lower pressure.
Figure 17:
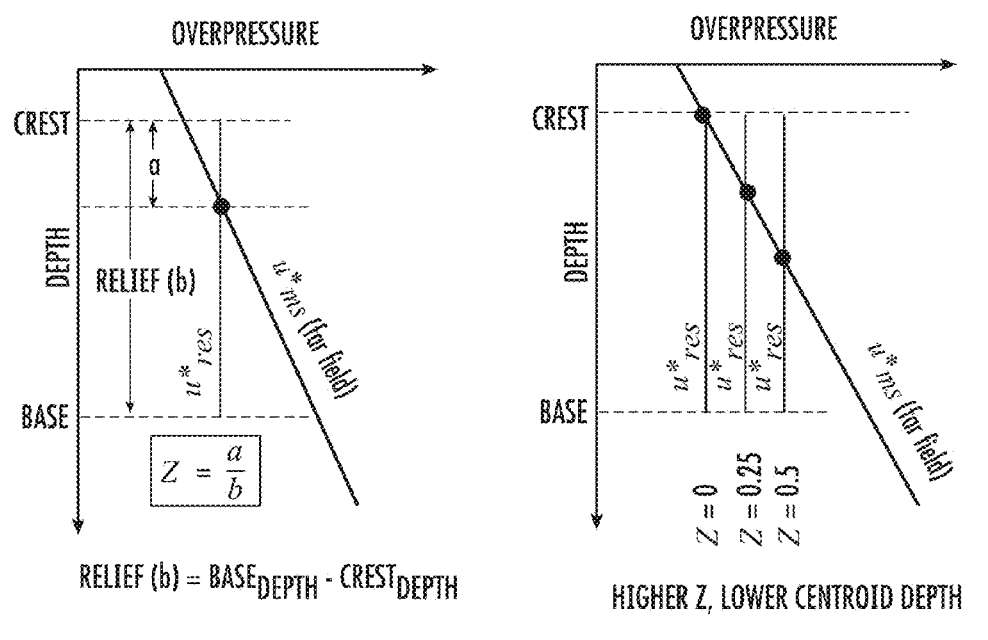
FIG. 17 shows "Z" (the relative depth where the reservoir pressure and the mudstone pressure are equal). At a higher Z, there is lower equal pressure depth.

A comparison with field observations can be made, as seen in FIG. 15. Predicting reservoir pore pressure can include predictions from previously acquired field measurements, or from a static model. The pressure predicted by the static model was compared with pressure obtained from two sources: basin model results and field pressure observations in Bullwinkle Basin (FIG. 15). The pressures predicted by the static model agree better with the field pressure observations in Bullwinkle Basin than with the previous steady flow model results.

Also disclosed herein is a system for predicting reservoir pore pressure for a reservoir, comprising: an apparatus adapted for determining mudstone permeability in mudstone bounding the reservoir, an apparatus adapted for establishing a structural model for the reservoir; an apparatus adapted for using these parameters to determine the depth where reservoir pressure equals mudstone and extrapolating results in order to predict reservoir pore pressure. The apparatuses for use with the system are referred to in more detail below. The apparatuses can be computer readable medium.

Computer Readable Storage Medium

Figure 18:
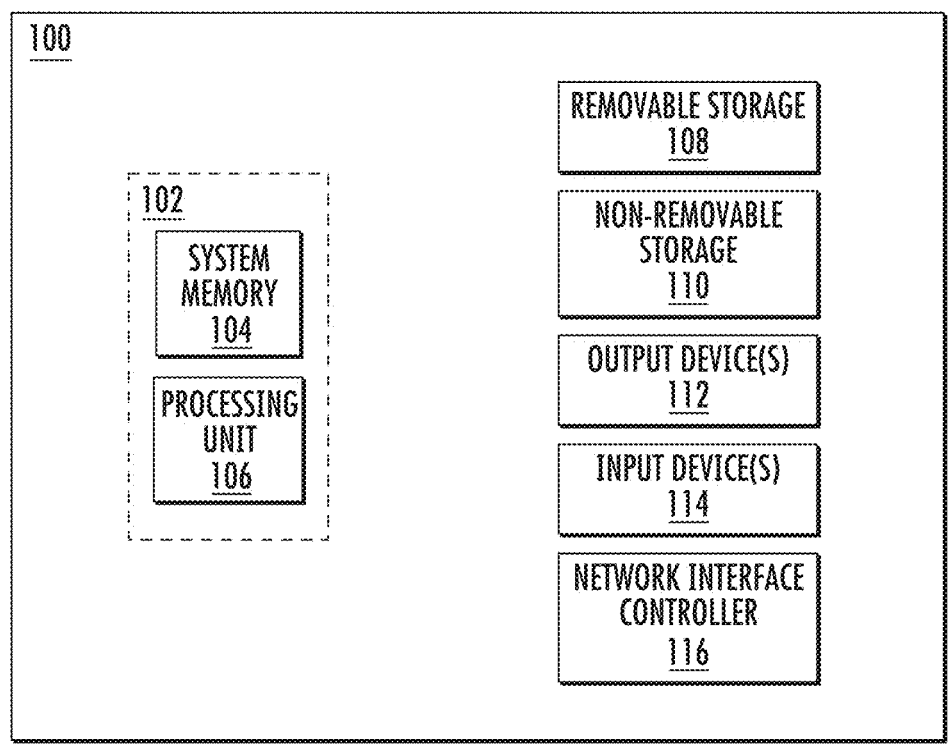
FIG. 18 shows a block diagram of an example computing device.
Figure 19:
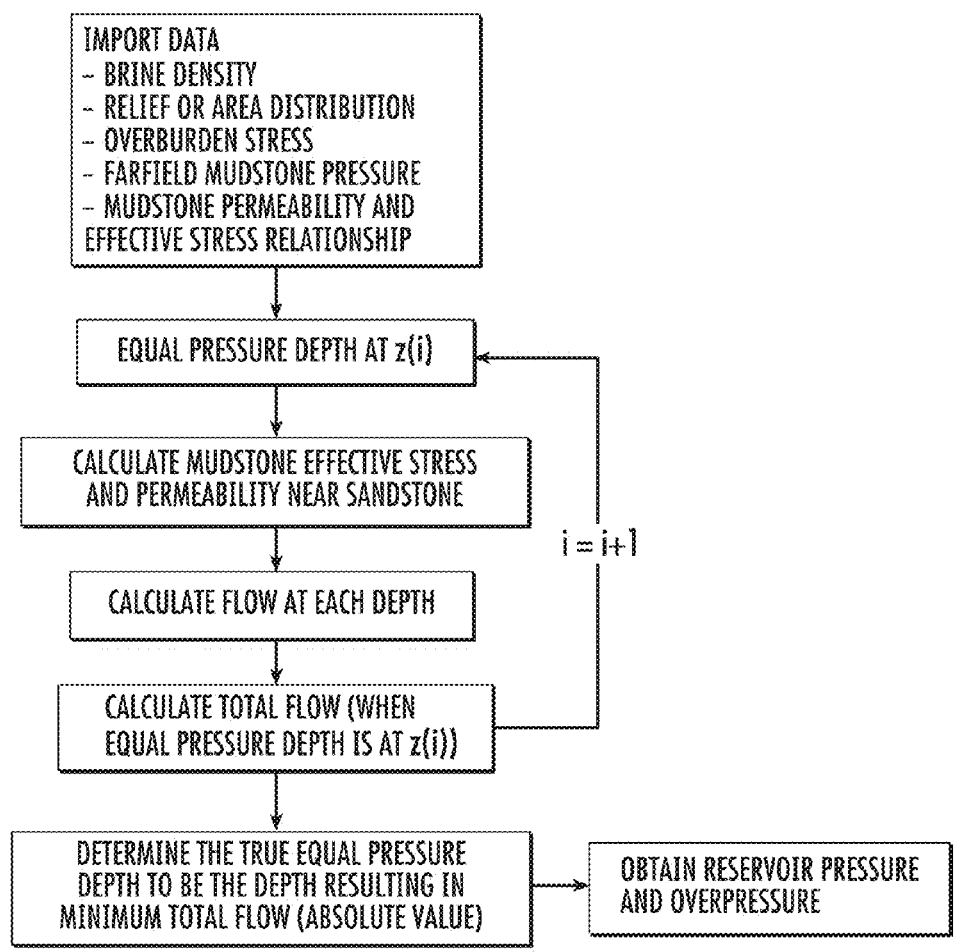
FIG. 19 is a flow chart showing a process as disclosed herein. Brine density is interpreted from estimates of salinity based on previous drilling. Relief and/or Area distribution are determined from making structural maps of the reservoir typically based on either seismic data, well data, or both. Overburden stress is determined by integrating the bulk density log from previous drilling in the region. The farfield mudstone pressure is determined through effective stress models that relate velocity (measured by seismic data) to effective stress (the difference between overburden pressure and pore pressure. Mudstone permeability vs. effective stress relationships are determined from clay fraction (the fraction of mudstone composed of clay sized particles) and composition (the type of clay particles) and is based on previous published experimental work.

Referring to FIG. 18, disclosed herein is a computer readable storage medium including code executed by a process to perform method steps for predicting reservoir pore pressure, the method steps comprising: determining mudstone permeability in mudstone bounding the reservoir; establishing a structural model for reservoir structure; using these parameters to determine the depth where reservoir pressure equals mudstone pressure; and extrapolating results in order to predict reservoir pore pressure.

The software disclosed herein (referred to alternatively as "UTCENTROID") is a computer readable medium that models subsurface overpressure in oil exploration and drilling applications. It is used to predict the pressure ahead of the drill bit. The software disclosed herein is used to simulate the pore pressure within petroleum reservoirs based on an understanding of the pressures present in the bounding mudstones. The model in UTCENTROID uses single-phase flow to describe the flow into and out of the petroleum reservoir. The software disclosed herein incorporates multiple different models to describe the permeability of the bounding mudstone. The software disclosed herein takes into consideration of and includes the geometry of the reservoir body. The software disclosed herein is used to simulate reservoir pressure for a complex pressure field within the mudstone.

The software disclosed herein incorporates the effect of permeability change in the mudstone due to effective stress change around the petroleum reservoir. It also incorporates the effect of complex reservoir geometries. The effect of mudstone pore pressure that increases non-linearly with depth is also incorporated into the software. The software disclosed herein predicts the reservoir water phase pressure; the maximum column of hydrocarbons that can be trapped; as well as the contrast between mudstone pressure and reservoir pressure for well design.

The equation:

$$u^*_{res} = \frac{\int_A k_{ms} u^*_{ms} dA}{\int_A k_{ms} dA} \quad (1)$$

where $u^*_{res}$ is reservoir overpressure, $k_{ms}$ is intrinsic permeability of the mudstone, $u^*_{ms}$ is mudstone overpressure, and $dA$ represents the area of the reservoir associated with a particular mudstone permeability. The results can be displayed on a graphical user interface (GUI) for example.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Referring to FIG. 18, embodiments of the methods and systems are described below with reference to block diagrams and flowchart illustrations of methods, systems, apparatuses and computer program products. It will be understood that each block of the block diagram and flowchart illustration can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagram and flowchart illustration support combinations of means for performing the specified functions, combinations of steps for performing the specified functions and program instruction means for performing the specified functions. It will also be understood that each block of the block diagram and flowchart illustration, and combinations of blocks in the block diagram and flowchart illustration, can be implemented by special purpose hardware-based computer systems that perform the specified functions or steps, or combinations of special purpose hardware and computer instructions.

Described herein are embodiments of a computer readable medium used to support reservoir pressure prediction. FIG. 18 is an overview of an embodiment of a computer readable medium for use with the methods disclosed herein. Results can be delivered to a gateway (remote computer via the Internet or satellite) for in graphical user interface format. The described system can be used with an algorithm, such as those disclosed herein.

FIG. 18 is an illustration of an exemplary computer 102 comprised of a processing unit 106 in communication with a memory 104. As may be understood from FIG. 18, in this implementation, the computer may include a processing unit 106 that communicates with other elements. Also included in the computer readable medium may be an output device 112 and an input device 114 for receiving and displaying data. This display device/input device may be, for example, a keyboard or pointing device that is used in combination with a monitor. The computer system 100 may further include at least one storage device, such as a hard disk drive, a floppy disk drive, a CD Rom drive, SD disk, optical disk drive, or the like for storing information on various computer-readable media, such as a hard disk, a removable magnetic disk, or a CD-ROM disk. These are illustrated in 108 and 110. As will be appreciated by one of ordinary skill in the art, each of these storage devices may be connected to the system bus by an appropriate interface. The storage devices and their associated computer-readable media may provide nonvolatile storage. It is important to note that the computer described above could be replaced by any other type of computer in the art. Such media include, for example, magnetic cassettes, flash memory cards and digital video disks.

Further comprising an embodiment of the system can be a network interface controller 116. One skilled in the art will appreciate that the systems and methods disclosed herein can be implemented via a gateway that comprises a general-purpose computing device in the form of a computing device or computer.

One or more of several possible types of bus structures can be used as well, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems, including the processor 106, a mass storage device, an operating system, network interface controller 116, Input/Output Interface 112/114, and a display device, can be contained within one or more remote computing devices at physically separate locations, connected through buses of this form, in effect implementing a fully distributed system.

The computer 102 typically comprises a variety of computer readable media. Exemplary readable media can be any available media that is accessible by the computer and comprises, for example and not meant to be limiting, both volatile and non-volatile media, removable and non-removable media. The system memory comprises computer readable media in the form of volatile memory, such as random access memory (RAM), and/or non-volatile memory, such as read only memory (ROM).

In another aspect, the computer 102 can also comprise other removable/non-removable, volatile/non-volatile computer storage media. For example and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device, including by way of example, an operating system and computational software. Each of the operating system and computational software (or some combination thereof) can comprise elements of the programming and the computational software. Data can also be stored on the mass storage device. Data can also be stored in any of one or more databases known in the art. Examples of such databases comprise, DB2™, MICROSOFT™ ACCESS, MICROSOFT™ SQL Server, ORACLE™, mySQL, PostgreSQL, and the like. The databases can be centralized or distributed across multiple systems.

In another aspect, the user can enter commands and information into the computer 102 via an input device. Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 106 via a human machine interface that is coupled to the network interface controller 116, but can be connected by other interface and bus structures, such as a parallel port, game port, an IEEE 1394 Port (also known as a Firewire port), a serial port, or a universal serial bus (USB).

In yet another aspect, a display device can also be connected to the system bus via an interface, such as a display adapter. It is contemplated that the computer 102 can have more than one display adapter and the computer can have more than one display device. For example, a display device can be a monitor, an LCD (Liquid Crystal Display), or a projector. In addition to the display device, other output peripheral devices can comprise components such as speakers and a printer which can be connected to the computer 102 via Input/Output Interface 112/114. Any step and/or result of the methods can be output in any form to an output device. Such output can be any form of visual representation, including, but not limited to, textual, graphical, animation, audio, tactile, and the like.

The computer 102 can operate in a networked environment. By way of example, a remote computing device can be a personal computer, portable computer, a server, a router, a network computer, a peer device, sensor node, or other common network node, and so on. Logical connections between the computer 102 and a remote computing device can be made via a local area network (LAN), a general wide area network (WAN), or any other form of a network. Such network connections can be through a network adapter. A network adapter can be implemented in both wired and wireless environments. Such networking environments are conventional and commonplace in offices, enterprise-wide computer networks, intranets, and other networks such as the Internet.

Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems described herein can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Pore Pressure within Dipping Reservoirs in Overpressured Basins

General

Static Model:

A static modeling approach that uses the permeability variation in the mudstone to provide predictions for the depth where reservoir pressure equals mudstone pressure was performed. This model was then used to study the effects of farfield mudstone vertical effective stress, sandstone reservoir structural relief, and mudstone compressibility on the relationship between mudstone pressure and sandstone pressure.

Model Approach:

The pore pressure in the mudstone was assumed to follow the lithostatic gradient whereas pore pressure in the reservoir follows the hydrostatic gradient. The lithostatic gradient is assumed constant and equals to 22.6 MPa/km (1 psi/ft) whereas the reservoir gradient is hydrostatic and equal to 10.3 MPa/km (0.46 psi/ft). The reservoir has a total structural relief defined by the parameter R.

$$R = z_{base} - z_{crest} \quad (2)$$

where R is the reservoir relief, $z_{base}$ is the deepest depth of the reservoir, and $z_{crest}$ is the shallowest depth of the reservoir (True vertical depth subsea).

The fluid was assumed to be incompressible, with constant viscosity, and flow is normal to the sand surface (FIG. 2a). Based on Darcy's law, the flux into the reservoir from the mudstone at any depth (i) is:

$$q_i = \frac{Q_i}{A_i} = \frac{-k_i}{\mu} \cdot \left(\frac{u^*_{res} - u^*_{ms}}{dx}\right) \quad (3)$$

where k is the intrinsic permeability of the mudstone near the reservoir at depth z, $\mu$ is fluid viscosity, $A_i$ is area element normal to the reservoir surface, dx is the characteristic length scale of the flow, $u^*_{ms}$ is the mudstone overpressure, and $u^*_{res}$ is the reservoir overpressure.

For the system to be at steady state, the integral of the volume flux of the entire surface of the reservoir must be equal to zero:

$$Q = \int\int_A q \cdot n \cdot dA = \int\int_A \frac{-k_i(z)}{\mu} \cdot \left(\frac{u^*_{res} - u^*_{ms}}{dx}\right) \cdot n \cdot dA = 0 \quad (4)$$

The flow through the two ends (left and right) of the reservoir was assumed negligible compared to the flow through to the top and bottom of the reservoir. In addition, flow through the top and bottom of the reservoir was assumed to be the same. Thus, for a two dimensional system of constant viscosity, this equation simplifies to (see Example 2, "Static Model" section):

$$\int_{z_{base}}^{z_{crest}} -k_i(z) \cdot (u^*_{res} - u^*_{ms}) \cdot dz = 0 \quad (5)$$

Equation 4 was integrated and the value of $u_{res}^*$ solved for (see Example 2, "Static Model" section). The parameter Z was introduced to quantitatively describe the depth where the mudstone pressure equals the reservoir pressure: Z is the ratio of the distance between the crest depth and the depth where the reservoir pressure equals mudstone pressure divided by the total structural relief of the reservoir (FIG. 2c):

$$Z = \frac{\bar{z} - z_{crest}}{R} \quad (6)$$

where $\bar{z}$ is the depth where mudstone pressure equals reservoir pressure, R is the total structural relief, and $z_{crest}$ is the shallowest depth of the structure.

The Z parameter shows the percentage of the structural relief that is above the depth where the sandstone and mudstone pressure are equal. Thus, Z=0 means the reservoir pressure equals the mudstone pressure at the crest of the structure whereas Z=0.5 means that the pressures are equal at the midpoint of the structure (FIG. 2d).

If mudstone permeability k does not change and mudstone pressure has linear relationship with depth, integrating of Eq. 4 yields Z=0.5. (see Example 2, "Constant Permeability" section).

Example Case:

In one example, the reservoir has a crestal height of 2000 mbsf (=2000 m) and a basal height of 2500 m (=2500) (FIG. 3a). The water depth is assumed to be 0 m. The lithostatic gradient is assumed to equal 22.6 MPa/km (1 psi/ft). The hydrostatic pressure is assumed to equal 10.3 MPa/km (0.46 psi/ft). The reduced lithostatic gradient is 12.3 MPa/km, which is the lithostatic pressure less the hydrostatic pressure (black line, FIG. 3a). The overpressure in the farfield mudstone is assumed to follow the reduced lithostatic gradient and be equal to 19.6 MPa at z=2000 m (light grey line, FIG. 3a). The farfield mudstone vertical effective stress is 5 Mpa, which is the difference between the farfield mudstone overpressure and the reduced lithostatic pressure (FIG. 3a).

Figure 4:
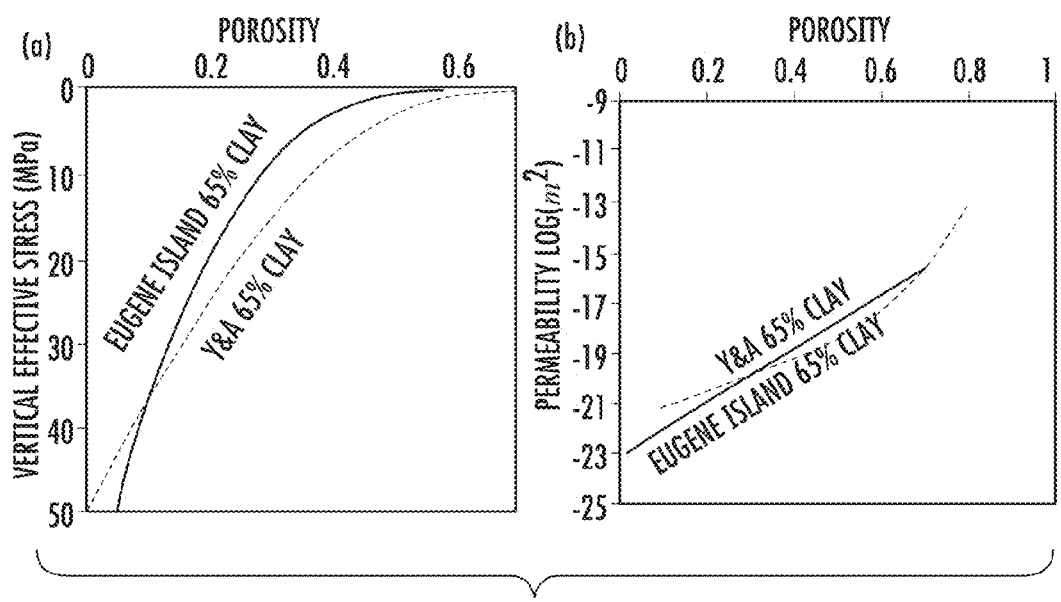
FIGS. 4 (a) and (b) show lithological properties. (a) shows a compression model of Eugene Island mudstone with 65% clay fraction and that of Yang and Aplin mudstone with 65% clay fraction. (b) shows a permeability model of Eugene Island mudstone with 65% clay fraction and that of Yang and Aplin mudstone with 65% clay fraction.

Finally, the permeability of the mudstone as a function of the vertical effective stress in the system was defined. The experimental results of Constant-Rate-of-Strain tests were used to define the compression and permeability behavior of the mudstone. The samples were from Eugene Island, Gulf of Mexico and have mass of clay fraction of 65% (Betts, S. W. Compressibility and permeability of Gulf of Mexico Mudrocks, Resedimented and In-Situ (Master Thesis) (2013)). The vertical effective stress, permeability, and porosity relationships of the mudstone are shown in FIG. 4. The detailed mathematical description is shown in the section below entitled, "Static Model."

The solution to Eq. 3 based on these parameters is that the equal pressure depth is at 2150 m (FIG. 3a, $u^*_{res}$=24.5 MPa) and as a result the Z value is 0.31.

The Z value is 0.31 as opposed to 0.5 in the case where permeability does not change because the permeability of the mudstone declines with depth (FIG. 3b). As the vertical effective stress increases from about 3 MPa to 9 MPa, the mudstone is compressed continuously, and the permeability of the mudstone surrounding the reservoir decreases from the crest location (1.1E−19 m$^2$) to the base location (9.5E−21 m$^2$) (FIG. 3b). From the crest to the base, the permeability of the mudstone decreases by about 11.8 times. To describe the degree of permeability contrast, parameter $k_r$, which is the ratio of mudstone permeability close to the crest of the reservoir to the permeability of the mudstone close to the base of the reservoir. In this case, $$k_r = \frac{k_{crest}}{k_{base}} = 11.8 \qquad (7)$$

Effects of Farfield Mudstone Vertical Effective Stress and Structural Relief:

The effect of farfield mudstone vertical effective stress on the relationship of mudstone and sandstone overpressure, and the effect of the sandstone's structural relief is discussed below.

Effect of Farfield Mudstone Vertical Effective Stress:

For a case with the same structural relief (500 m), but a higher farfield mudstone vertical effective stress, farfield=20 MPa (FIG. 5a), the mudstone overpressure gradient still follows the reduced lithostatic pressure gradient and it equals 4.6 MPa at z=2000 m.

The result of this example is that the equal pressure depth is at 2210 m (FIG. 5a). The predicted reservoir overpressure and Z value equals 0.42 (FIG. 5c). The Z value 0.42, obtained from this high mudstone vertical effective stress example, which is greater than the previous example, is caused by a low permeability contrast kr. Under the higher effective stress conditions, there is less change in mudstone permeability than under low stress conditions. In the example, with high farfield mudstone vertical effective stress, the mudstone vertical effective stress increases from 17.4 Mpa to 23.6 Mpa and the mudstone permeability decreases from 1.5E−21 m$^2$ to 5.4E−22 m$^2$ along the dipping reservoir. The mudstone permeability contrast kr=2.8 (FIG. 5b). Compare the high farfield mudstone vertical effective stress example and low farfield mudstone vertical effective stress example (FIG. 5b); the low farfield vertical effective stress case (with rcircle symbols) has a higher permeability contrast (kr=11.8) than that of the high farfield vertical effective stress example (kr=2.8, with square symbols). Thus, for the same structural relief, the higher the farfield mudstone vertical effective stress leads to (1) the less mudstone permeability contrast surrounding the reservoir, (2) a higher Z value and (3) a greater equal pressure depth.

Effect of Sandstone Structural Relief:

The effect of structural relief was studied by considering a case where the structural relief (R) is 1500 m in contrast to the previous example where it was 500 meters. The farfield mudstone vertical effective stress farfield equals 5 Mpa.

The result of this case is that the equal pressure depth is at 2225 m (u*$_{res}$=22.4 MPa) and the Z parameter value equals 0.15 (FIG. 6c). The low Z value 0.15 obtained from this high structural relief example is due to a greater permeability contrast kr. In this 1500 m structural relief example (FIG. 6, triangles), along the dipping reservoir, the mudstone vertical effective stress increased from 2.3 MPa to 20.8 MPa and the mudstone permeability decreases from 2.0E−19 m$^2$ to 8.4E−22 m$^2$ (FIG. 6b). This change in mudstone permeability yields the permeability contrast parameter kr=233.5. On the contrary, in the low structural relief example (red line, FIG. 6b), the mudstone undergoes much less vertical effective stress and permeability change, which results in a permeability contrast parameter kr=11.8.

This comparison shows that if the farfield mudstone vertical effective stress remains the same, then, higher structural relief leads to (1) the higher mudstone vertical effective stress change near the reservoir, (2) higher mudstone permeability contrast along the dipping reservoir, (3) a lower the Z value, and the shallower equal pressure depth.

Z Value Nomogram:

The effect of reservoir structural relief and farfield mudstone vertical effective stress on the Z value, the parameter indicates the equal pressure depth is shown in FIG. 7. As relief increases, the Z value decreases and the equal pressure depth shifts towards the crest. As the farfield vertical effective stress increases, the Z parameter increases, which indicates that the equal pressure depth is close to the mid-point of the structure.

Effect of Mudstone Compressibility:

The effect of mudstone compressibility on the depth where reservoir overpressure equals farfield mudstone overpressure is discussed below. The compression index, Cc, can be mathematically described as follows:

$$C_c = \frac{e_1 - e_2}{\log\left(\frac{\sigma_2'}{\sigma_1'}\right)} \qquad (8)$$

where $e_2$ and $e_1$ are the mudstone void ratio at the vertical effective stress $\sigma_2'$ and $\sigma_1'$ respectfully.

The rock with a higher Cc value has a higher compressibility and vice versa. FIG. 8a shows two mudstone compression curves: one with high compressibility, Cc=0.49 and the other with low compressibility, Cc=0.2.

The results of the low compressibility example (Cc=0.2) is that the equal pressure depth is at z=2215 m. Z parameter equals 0.43 and the predicted reservoir overpressure u*$_{res}$=22.2 MPa.

Figure 8:
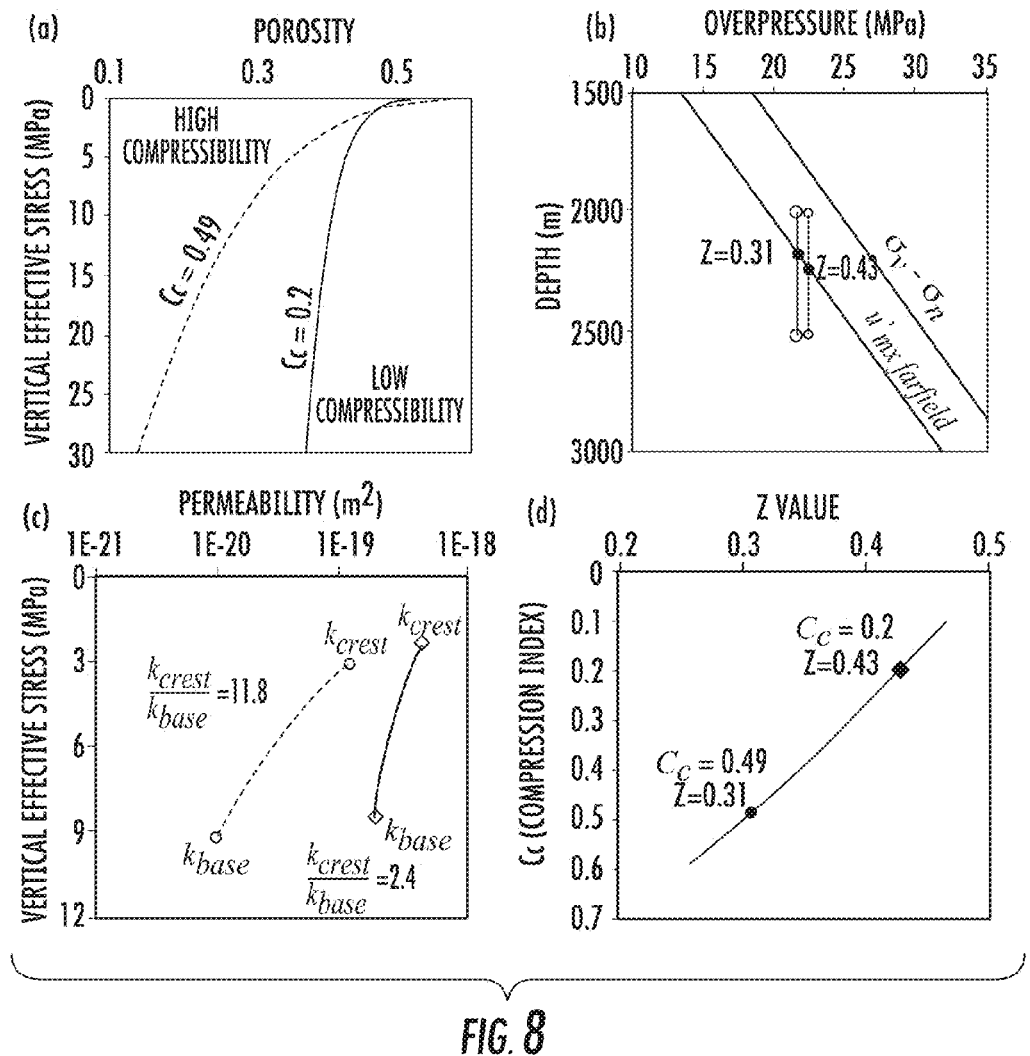
FIGS. 8 (a)-(d) show the effect of compressibility on permeability changes and the equal pressure depth. (a) Uniaxial compression behavior for 2 compressibility values (CC=0.2 and 0.49) are shown. (b) Overpressure plot is shown. The higher mudstone compressibility leads to a shallower equal pressure depth (c) Permeability versus vertical effective stress plot is shown. Increasing compressibility leads to a larger change in the permeability in the mudstones around the reservoir. (d) Parameter Z versus compressibility is shown. The higher the compressibility (Cc), the lower the Z value, and hence, the shallower the equal pressure depth.

The high Z value 0.43 from the low mudstone compressibility example is due to the low permeability contrast. In the low mudstone compressibility example (FIG. 8, with purple symbols), as the mudstone vertical effective stress increases from about 2.4 Mpa to 8.5 Mpa (FIG. 8c), the mudstone permeability decreases from about 4.5E−19 m$^2$ to 1.8E−19 m$^2$ along the crest to the base of the reservoir. The permeability contrast $k_r$ is 2.4 in the low mudstone compressibility example. In the high mudstone compressibility case, even though the mudstone vertical effective stress change is similar (increase from about 3 Mpa to 9 Mpa), the mudstone permeability change is much greater (k$_r$=11.8) (FIG. 8c).

Thus, lower mudstone compressibility leads to: (1) lower mudstone permeability contrast, (2) higher Z parameter, (3) greater depth where reservoir overpressure equals mudstone overpressure.

Figure 9:
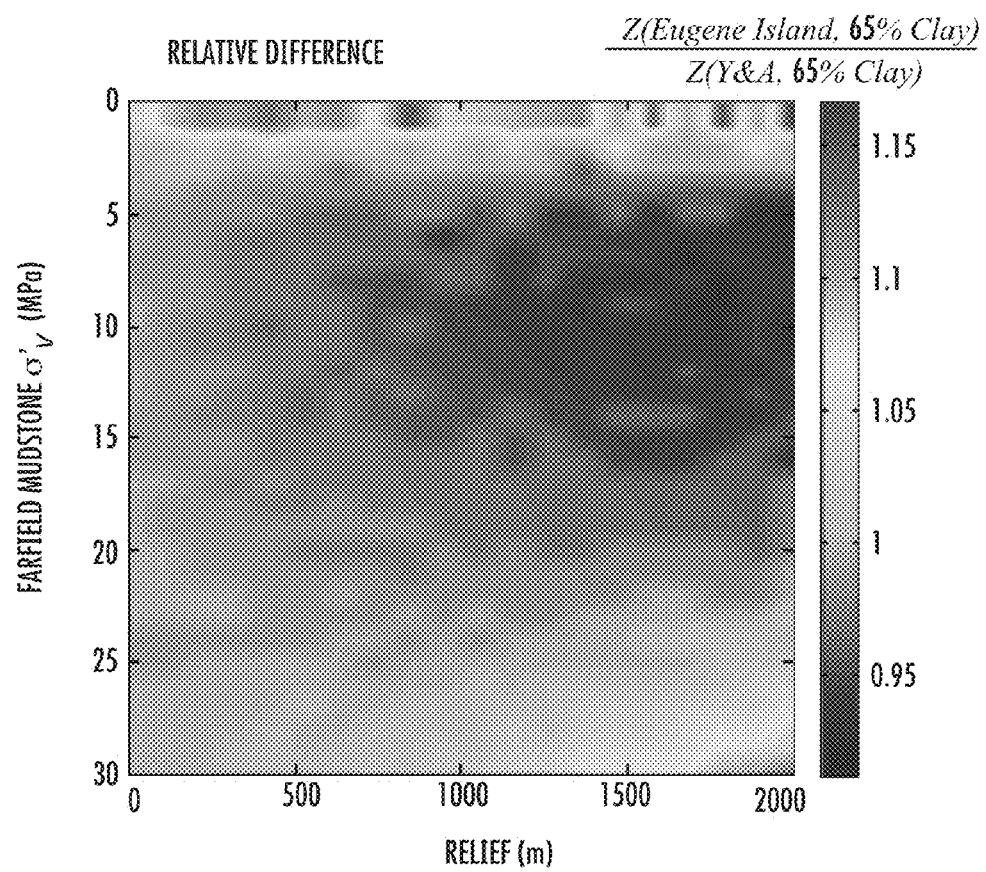
FIG. 9 shows the effect of lithology on the Z parameter. 2 mudstones with the same clay content (65%) but different lithology model (Eugene Island and Y&A (Yang, Y. et al. Petroleum Geoscience Vol 10, p. 153-162 (2004); Yang, Y. et al. Marine and Petroleum Geology Vol 27, p. 1692-1697 (2010)) are compared. The different lithology doesn't have much effect on the equal pressure depth (with the exception of low vertical effective stress levels).

Comparison with Other Mudstone Models:

Yang and Aplin's (Yang, Y. et al. Petroleum Geoscience Vol 10, p. 153-162 (2004); Yang, Y. et al. Marine and Petroleum Geology Vol 27, p. 1692-1697 (2010)) lithology models were used as a comparison example to study how the lithology models affect the relationship of sandstone and mudstone overpressure. FIG. 4 shows the permeability and compression behaviors of the mudstone with clay fraction of 65% (Yang, Y. et al. Petroleum Geoscience Vol 10, p. 153-162 (2004); Yang, Y. et al. Marine and Petroleum Geology Vol 27, p. 1692-1697 (2010)). FIG. 9 shows the relative difference of Z parameter predicted by using Eugene Island's lithology model (65% clay) and Yang and Aplin's lithology model (65% clay). The relative difference in Z is small by using these two lithology models, which indicates the depth where reservoir pressure equals farfield mudstone pressure is not very sensitive to a particular mudstone model.

Model Verification and Validation:

To test the reliability of the static model, the results from the static model were compared to both the basin model results and field pressure observations.

Basin Model:

The effect of spatial permeability variations on overpressure development was performed by a forward model approach (basin model) that couples sedimentation and flow behavior during burial. The control equation is shown in Equation 8 (Hantschel, T. et al. Fundamentals of basin and petroleum systems modeling. Springer (2009)):

$$\frac{\partial u}{\partial t} = \nabla \cdot \left(\frac{1-\phi}{c} \cdot \frac{k}{\mu}\right) \cdot \nabla u + \frac{\partial \sigma_v}{\partial t} \quad (9)$$

where, u is pore pressure, t is time, $\phi$ is porosity, k is intrinsic permeability, $\sigma_v$ is lithostatic pressure, $\mu$ is viscosity, and C is compressibility. The equation shows that pore pressure changes during burial are related to both rock mechanical properties and the sediment loading rate. To compare permeability variation in the mudstone around the dipping reservoir and its effect on the depth where reservoir pressure equals mudstone pressure, a constant permeability model and C a porosity dependent permeability model was conducted.

First, a model frame was set up. Model frame set-up and boundary conditions: The burial and consolidation of a sandstone reservoir (FIG. 10) was modeled. First, a 20 km thick layer is deposited between 0 m.y. and 20 m.y. Second, a 0.3 km thick, 6 km long sandstone was deposited on top of the previous mudstone layer between 20 m.y. and 23 m.y. Mudstone was deposited laterally to the sandstone. Finally, another mudstone layer was deposited asymmetrically on top of the sandstone layer between 23 m.y. and 43 m.y. The left end of the sandstone was buried to a depth of 4780 m depth and the right end was buried to 5570 m. The angle of the dipping sand reservoir is about 7.5 degrees. The water level, which is assumed to lie at the upper sediment surface, does not change with time. In this basin model, no overpressure is generated at the seafloor. The left, right, and bottom sides are no-flow boundaries.

Lithological Properties:

The sandstone and mudstone compressibility and permeability are described below. For the compressional behavior of the mudstone and sandstone, the void ratio is proportional to the log of vertical effective stress as in Eq. 9 (FIG. 11a) was assumed.

$$e = e_0 - C_c \log\left(\frac{\sigma'}{\sigma'_o}\right) \quad (10)$$

where e is the void ratio, which is proportional to porosity;

$$e = \frac{\phi}{1-\phi} \quad (11)$$

$e_o$ is the reference void ratio, the void ratio present at a reference vertical effective stress ($\sigma_0'$) of 1 MPa, and Cc is the compression coefficient of primary consolidation.

The specific compression parameters used for this simulation are shown in Table 1. The parameters for mudstone compression model are from CRS test and the test samples are from Eugene Island, Gulf of Mexico (Betts, S. W. Compressibility and permeability of Gulf of Mexico Mudrocks, Resedimented and In-Situ (Master Thesis) (2013)). The parameters for sandstone compression are from the lab tests on the samples from Green Canyon Block 65, Gulf of Mexico (Kevin, D. Best. Development of an Integrated Model for Compaction/Water Driven Reservoirs and its Application on the J1 and J2 Sands at Bullwinkle, Green Canyon Block 65, Deepwater Gulf of Mexico (Master Thesis) (2002)). Eq. 9 has been used in soil mechanics for decades (Dugan et al., Earth and Planetary Science Letters Vol 215, p. 13-26, 86 (2003); Lambe, T et al. Soil Mechanics, SI Version, J. Wiley and Sons, New York (1979); Terzaghi, K et al., Soil mechanics in engineering practice. Wiley-Interscience (1996)) and has also been applied to describe the compression behavior of geological systems (Dugan, B et al. Earth and Planetary Science Letters Vol 215, p. 13-26, 86 (2003); Long, H et al. Earth and Planetary Science Letters Vol 305, p. 11-20 (2011); Saffer, D. M. Journal of Geophysical Research Vol 108, p. 2261 (2003); Schneider, J. et al. Journal of Geophysical Research Vol 114, B05102 (2009); Stigall, J. et al. Journal of Geophysical Research Vol 115, B04101 (2010)).

TABLE 1

Lithology Parameters

| Lithology | $e_0$ | $\sigma_0^1$ (MPa) | $C_c$ | $A_k$ (log(m$^2$)) | $B_k$ (log(m$^2$)) |
|---|---|---|---|---|---|
| Sandstone | 0.76 | 1 | 0.21 | 12.5 | −16.3 |
| Mudstone (Various Perm) | 0.88 | 1 | 0.49 | 10.65 | −23.1 |
| Mustone (Const. Perm) | 0.88 | 1 | 0.49 | 0 | −19 |

The parameters of the sandstone properties are from the sample in Green Canyon Block 65, GOM. The parameters of the mudstone properties are from the sample in Eugene Island, GOM.

Two approaches were used to model mudstone permeability (FIG. 11b). In the constant permeability model, mudstone permeability is assumed to be constant (1.0E−19 m$^2$). In the porosity dependent permeability model, I assume a log linear relationship between permeability and porosity in the mudstone (Table 1, FIG. 11):

$$\log(k) = A_k \phi + B_k \quad (12)$$

where Ak and Bk are empirical constants (Mello, U. T. et al. Journal of Geophysical Research Vol 99, p. 2775-2789 (1994)), which can be measured from the constant rate of strain consolidation (CRS) tests. The permeability model for the porosity dependent permeability model (Various Perm) is based on the CRS test results (Eugene Island sample, (Betts, S. W. Compressibility and permeability of Gulf of Mexico Mudrocks, Resedimented and In-Situ (Master Thesis) (2013)). The sandstone permeability model is based on the lab test of sandstone samples from Green Canyon Block 65, Gulf of Mexico (Kevin, D. Best. Development of an Integrated Model for Compaction/Water Driven Reservoirs and its Application on the J1 and J2 Sands at Bullwinkle, Green Canyon Block 65, Deepwater Gulf of Mexico (Master Thesis) (2002)).

Basin Model Results

Constant permeability: In this model, mudstone permeability is constant (1.0E−19 m$^2$) during burial. The equal pressure depth is at the midpoint of the structure (about 5160 m, FIG. 12) and it results in Z parameter equals 0.5. This result is consistent with the previous analysis: when the mudstone permeability is assumed constant, the equal pressure depth is at the midpoint of the structure.

Variable Permeability:

The reservoir overpressure predicted by the basin model (variable mudstone permeability) equal the farfield mudstone overpressure at 4870 m and the reservoir overpressure was predicted to be about 41.2 Mpa and the Z parameter equals 0.27.

The variable permeability model is more realistic because it accounts for changes in mudstone permeability during burial. At the far field, as sediments are deposited, existing sediments are buried, and hence vertical effective stress increases, and the porosity and permeability of the sedimentary package decreases. In addition, near the dipping structure, permeability also changes due to the local flow in and out of the reservoir. At the final stage (FIG. 13), mudstone permeability is lower around the base of the dipping reservoir and higher at the crest. The difference is approximately one order of magnitude in this case.

Using the information from the variable permeability basin model (relief R=1100 m, farfield mudstone vertical effective stress equals 10.5 MPa, FIG. 13), The static model was run and it was found that the parameter Z equals 0.26 and the depth where reservoir overpressure equals mudstone overpressure at about 4850 m. The reservoir overpressure predicted by static model is about 41.1 MPa. These results show that the overpressure pressure predicted from static model agrees with overpressure predicted from basin models.

These two basin model results prove that mudstone permeability around a dipping reservoir has a significant effect on the relationship of reservoir overpressure and mudstone overpressure. When the mudstone permeability is assumed constant, the depth where sandstone and mudstone pressure are equal is at the midpoint of the structure; however, when mudstone permeability is a function of vertical effective stress, the equal pressure depth is shallower. In terms of a physical explanation, as the fluid in the mudstone near the bottom of the reservoir is drained into the reservoir, the mudstone becomes more consolidated (has a higher vertical effective stress) than the mudstone in the far field. The higher vertical effective stress leads to lower permeability around the down-dip portion of the reservoir. As a result, less high overpressure fluid in the deeper mudstone contributes to overpressure development inside the reservoir due to the low permeability. In other words, the reservoir is more isolated from the highly overpressured fluid. In contrast, the mudstone around the reservoir crest has a lower vertical effective stress, higher porosity, and higher permeability.

Compare Field Pressure Observations in the Bullwinkle Basin, Gulf of Mexico:

The Bullwinkle Basin is located offshore about 250 km southwest of New Orleans on the Gulf of Mexico continental slope (Flemings, P. B. et al. Marine and Petroleum Geology Vol 21, p. 1311-1322 (2004)). The field is in Green Canyon Block 65 in 1350 feet of water. Rapid sedimentation loading caused the salt underneath to withdraw and form the Bullwinkle Basin in Late Miocene to Early Pliocene slope (Flemings, P. B. et al. Marine and Petroleum Geology Vol 21, p. 1311-1322 (2004)). The J sandstone package, which formed at 3.35 Ma, hosts significant hydrocarbon reserves (Flemings, P. B. et al. Marine and Petroleum Geology Vol 21, p. 1311-1322 (2004)). The package is composed of amalgamated channels and turbidities. The depletion curves observed during production (Holman, W. E. et al. SEPM Foundation, Coast Section, 15$^{th}$ Annual Bob Perkins Research Conference SEPM, p. 425-437 (1994)) show that the sandstones are highly interconnected and not compartmentalized as often occurs with depositionally and structurally complex reservoirs such as these (Snedden, John W. et al. Reservoir Connectivity: Definitions, Strategies, and Applications: International Petroleum Technical Conference: IPTC 11375 MS, 7 pages and figures (2007)). The static model was used to predict overpressure in the J sand package. The crest of the J sand package is about 3300 m and bottom is about 4060 m. Therefore, the relief of the J sand package is about 760 m. Farfield mudstone overpressure was estimated from the sonic logging data ((Flemings, P. B. et al. Marine and Petroleum Geology Vol 21, p. 1311-1322 (2004)). Using the lithostatic pressure and estimated farfield mudstone overpressure, the farfield mudstone vertical effective stress is calculated to be about 13 MPa. Using the nomogram in FIG. 7, the static model results indicate that the Z parameter is approximately 0.34. The reservoir overpressure is predicted to be 19.72 MPa. Compared to the field pressure observation (Z=0.33, 19.65 MPa), the static model results agree relatively closely with field pressure observations (FIG. 15).

Example 2: Pressure Prediction Methods

Static Model

Darcy's Law was combined with volume conservation and it was assumed that the flux into the reservoir equals the flux out of the reservoir:

$$\int_{z_1}^{z_2} Q(z)\,dz = \int_{z_1}^{z_2} \frac{-k_i(z)}{\mu} \cdot dA \cdot \left(\frac{u^*_{res} - u^*_{ms}}{dx}\right) = 0 \qquad (29)$$

The area (dA) is:

$$dA = \frac{(dz)}{\cos\theta} \cdot dy \qquad (30)$$

Equations 29 and 30 were combined:

$$\int_{z_1}^{z_2} \frac{-k_i(z)}{\mu} \cdot \left(\frac{dz}{\cos\theta} \cdot dy\right) \cdot \left(\frac{u^*_{res} - u^*_{ms}}{dx}\right) = 0 \qquad (31)$$

Assuming the surface of the dipping reservoir is a flat plane, dx and dy are constant, then the following format is obtained:

$$\int_{z_1}^{z_2} -k_i(z) \cdot dz \cdot (u^*_{res} - u^*_{ms}) = 0 \qquad (32)$$

Equation 31 can be discretized as follows:

$$\Sigma_{i=1}^{n} k_1(z) \cdot dz \cdot [u^*_{ms(i)}(z) - u^*_{res}] = 0 \qquad (33)$$

To solve Eq. 33, the relationship between vertical effective stress and permeability and the vertical effective stress in the mudstone at any depth must be known. The approach is as follows.

It is assumed that the overpressure in the sandstone must lie somewhere between the mudstone overpressure at the top of the reservoir and the mudstone overpressure at the base of the reservoir;

It is also assumed that the overburden stress and hydrostatic pressure increase linearly with depth.

$$\sigma_v = m_1 z + b_1 \qquad (34)$$

$$u_h = m_2 z + b_2 \qquad (35)$$

Then the reduced lithostatic pressure is $$u^*_{litho} = \sigma_v - u_h = m_3 z + b_3 \qquad (36)$$

$$m_3 = m_1 - m_2, b_3 = b_1 - b_2 \qquad (37)$$

The farfield mudstone overpressure is assumed to have a linear relationship with depth and the overpressure gradient is assumed to equal the reduced lithostatic pressure gradient:

$$u^*_{ms} = m_3 z + b_4 \qquad (38)$$

In an ideal connected dipping reservoir, the reservoir overpressure is identical. In the first trial, the depth is assumed where reservoir overpressure equals farfield mudstone overpressure at the crest of the reservoir $z1$, $$u^*_{res} = u^*_{ms}(z_1) = m_3 z_1 + b_4 \qquad (39)$$

Surrounding the reservoir, the mudstone overpressure is close to the reservoir overpressure:

$$u^*_{ms}(\text{surrounding}) \approx u^*_{res} = m_3 z_1 + b_4 \qquad (39.5)$$

Under this condition, the mudstone vertical effective stress surrounding the reservoir can be calculated as follows:

$$\sigma'_{v(ms)}(\text{surrounding}) = u^*_{litho} - u^*_{res} = m_3 z + b_3 - (m_3 z_1 + b_4) = m_3 z - m_3 z_1 + b_5 \qquad (40)$$

where $b_5 = b_3 - b_4$. Therefore, the mudstone vertical effective stress increases linearly with depth surrounding a dipping reservoir.

With the vertical effective stress, permeability was calculated in the surrounding mudstone according to the compression model and permeability model. The lithology parameters used are from the CRS test results. The mudstone sample is from Eugene Island and has 65% clay fraction The compression model of the mudstone:

$$e = 0.88 - 0.49 \log(\sigma'_v) \qquad (41)$$

where $e$ is void ratio, is vertical effective stress and void ratio $e$ is a function of porosity:

$$\phi = \frac{e}{1+e} \qquad (42)$$

The relationship between mudstone permeability and mudstone porosity is defined:

$$\log(k) = 10.65\phi - 23.1 \qquad (43)$$

Combining Eq. 39, Eq. 42 and Eq. 43, the mudstone permeability function of the mudstone vertical effective stress is derived:

$$k = 10^{10.65 \cdot \frac{0.88 - 0.49 \log(\sigma'_v)}{1.88 - 0.49 \log(\sigma'_v)} - 23.1} \qquad (44)$$

Substitute Eq. 40 to Eq. 44, the mudstone permeability surrounding the reservoir is:

$$k(\text{surrounding}) = 10^{10.65 \cdot \frac{0.88 - 0.49 \log(m_3 z - m_3 z_1 + b_5)}{1.88 - 0.49 \log(m_3 z - m_3 z_1 + b_5)} - 23.1} \qquad (45)$$

Combine Eq. 37 and Eq. 38:

$$u^*_{ms} - u^*_{res} = m_3 z - m_3 z_1 \qquad (46)$$

Calculate the total flux by substituting Eq. 45 and Eq. 46 in the following equation:

$$Q = \int_{z_1}^{z_2} Q_i = \int_{z_1}^{z_2} \frac{-k_i(z)}{\mu} \cdot dA \cdot \left( \frac{u^*_{res} - u^*_{ms}}{dx} \right) \qquad (47)$$

It is found:

$$Q = \int_{z_1}^{z_2} -10^{10.65 \times \frac{0.88 - 0.49 \log(m_3 z - m_3 z_1 + b_5)}{1.88 - 0.49 \log(m_3 z - m_3 z_1 + b_5)} - 23.1} \frac{dA}{\mu \cdot dx} \cdot (m_3 z - m_3 z_1) \qquad (48)$$

Similarly, the total flux is calculated by assuming reservoir overpressure equals mudstone overpressure at depth of $(z1+dz)$. For this case, the total flux is:

$$Q = \int_{z_1}^{z_2} -10^{10.65 \times \frac{0.88 - 0.49 \log(m_3 z - m_3 (z_1 + dz) + b_5)}{1.88 - 0.49 \log(m_3 z + b_3 - [m_3(z_1 + da) + b_4])} - 23.1} \cdot \qquad (49)$$

$$\frac{dA}{\mu \cdot dx} \cdot (m_3 z - m_3 (z_1 + dz))$$

Potential depth is iterated where reservoir overpressure equals mudstone overpressure $(z1, z1+dz, z1+2dz \ldots z2-dz, z2)$ and the total flux for each case is calculated. The true depth where reservoir overpressure equals farfield mudstone overpressure and true reservoir overpressure is the case that yields $Q=0$ (satisfy volume conservation) is then calculated.

Constant Permeability Case

Simplified flow balance equation is:

$$\int_{z_1}^{z_2} -k_i(z) \cdot (u^*_{res} - u^*_{ms}) \cdot dz = 0 \qquad (50)$$

Eq. 50 can be written in the following form:

$$\int_{z_1}^{z_2} k_i(z) \cdot u^*_{res} \cdot dz = \int_{z_1}^{z_2} k_j(z) \cdot u^*_{ms} \cdot dz \qquad (51)$$

Permeability $k$ is a constant value. Then the term can be cancelled out:

$$\int_{z_1}^{z_2} u^*_{res} \cdot dz = \int_{z_1}^{z_2} u^*_{ms} \cdot dz \qquad (52)$$

$$u^*_{res} = \frac{\int_{z_1}^{z_2} u^*_{ms} \cdot dz}{z_2 - z_1} \qquad (53)$$

Assume is a linear function of depth:

$$u^*_{ms} = cz + a. \qquad (54)$$

Where $c$ is the gradient of the farfield mudstone overpressure and $a$ is the intercept. Substitute Eq. 54 to Eq. 53 and solve for:

$$u^*_{res} = \frac{\int_{z_1}^{z_2} u^*_{ms} \cdot dz}{z_2 - z_1} \quad (55)$$

$$= \frac{\int_{z_1}^{z_2} (cz + a) \cdot dz}{z_2 - z_1}$$

$$= \frac{\left(\frac{1}{2}cz_2^2 + az_2\right) - \left(\frac{1}{2}cz_1^2 + az_1\right)}{z_2 - z_1}$$

$$= \frac{\frac{1}{2}c(z_2^2 - z_1^2) - a(z_2 - z_1)}{z_2 - z_1}$$

$$= \frac{\frac{1}{2}c(z_2 - z_1)(z_2 + z_1) - a(z_2 + z_1)}{z_2 - z_1}$$

$$= \frac{1}{2}c(z_2 + z_1) - a$$

$$u^*_{res} = \frac{c \cdot \frac{1}{2}(z_2 + z_1)}{\text{Midpoint}} - a$$

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of predicting reservoir pore pressure and adjusting a drilling operation based on the predicted reservoir pore pressure, comprising:
   a) determining mudstone pressure in mudstone bounding the reservoir;
   b) determining the mudstone permeability;
   c) establishing a structural model for reservoir structure;
   d) using the parameters of step a), b), and c) to determine a depth where reservoir pressure equals mudstone pressure;
   e) extrapolating results of step d) in order to predict reservoir pore pressure; and
   f) adjusting the drilling operation based on the reservoir pore pressure by at least adjusting a drilling fluid density, adjusting a drilling trajectory, or optimizing a number of casing strings in a borehole.

2. The method of claim 1, where pore pressure is determined for a well location ahead of a bit.

3. The method of claim 1, wherein effective vertical stress of mudstone is used in determining mudstone permeability.

4. The method of claim 1, wherein the equation:

$$u^*_{res} = \frac{\int_A k_{ms} u^*_{ms} dA}{\int_A k_{ms} dA}$$

is used to predict reservoir overpressure, where $u^*_{res}$ is reservoir overpressure, $k_{ms}$ is intrinsic permeability of the mudstone, $u^*_{ms}$ is mudstone overpressure, and $dA$ represents the area of the reservoir associated with a particular mudstone permeability.

5. The method of claim 1, wherein the mudstone permeability of step b) is farfield mudstone.

6. The method of claim 1 wherein predicting reservoir pore pressure includes predictions from previously acquired field measurements.

7. The method of claim 1, wherein step c) of establishing a structural model includes using structural relief to determine the deepest depth and shallowest depth of the reservoir.

8. The method of claim 1 wherein the step c) of establishing the structural model includes using seismic interpretations.

9. The method of claim 1 wherein the step c) of establishing the structural model includes two- or three-dimensional cross sections.

10. The method of claim 1, wherein a casing depth is calculated based on the reservoir pore pressure and a casing is inserted in a reservoir to the casing depth.

11. The method of claim 1, wherein a drilling mud is prepared with a density that is appropriate for the predicted reservoir pore pressure and the mud is added to a well.

12. The method of claim 2, wherein well location comprises a location below an operating drill bit in a borehole.

13. The method of claim 1, wherein the predicted pore pressure is displayed on a graphical user interface.

* * * * *